(12) United States Patent
Nakajima et al.

(10) Patent No.: US 11,401,878 B2
(45) Date of Patent: Aug. 2, 2022

(54) FUEL INJECTION CONTROL APPARATUS

(71) Applicant: Honda Motor Co., Ltd., Tokyo (JP)

(72) Inventors: Masatoshi Nakajima, Wako (JP); Hidekazu Hironobu, Wako (JP); Daiki Yamazaki, Wako (JP); Ryuichi Hata, Wako (JP); Nobuaki Ito, Wako (JP); Yasunori Shinmi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/215,258

(22) Filed: Mar. 29, 2021

(65) Prior Publication Data

US 2021/0301747 A1    Sep. 30, 2021

(30) Foreign Application Priority Data

Mar. 31, 2020    (JP) .............................. JP2020-065397

(51) Int. Cl.
  *F02D 41/18* (2006.01)
  *F02D 41/02* (2006.01)
  *F02D 41/00* (2006.01)

(52) U.S. Cl.
  CPC ......... *F02D 41/182* (2013.01); *F02D 41/009* (2013.01); *F02D 41/0255* (2013.01); *F02D 2200/0602* (2013.01); *F02D 2200/0606* (2013.01)

(58) Field of Classification Search
  CPC .. F02D 41/182; F02D 41/009; F02D 41/0255; F02D 2200/0602; F02D 2200/0606
  See application file for complete search history.

(56) References Cited

U.S. PATENT DOCUMENTS

| 2012/0245827 A1* | 9/2012 | Glugla | F02D 41/402 701/105 |
| 2012/0259529 A1* | 10/2012 | Matthews | F02D 41/1497 701/102 |
| 2012/0260887 A1* | 10/2012 | Kuzuyama | F02B 23/0672 123/295 |

FOREIGN PATENT DOCUMENTS

| JP | H09151770 A | 6/1997 |
| JP | 2020016154 A | 1/2020 |
| JP | 2020033963 A | 3/2020 |

OTHER PUBLICATIONS

Japanese office action; Application 2020-065397; dated Dec. 14, 2021.

* cited by examiner

*Primary Examiner* — Sizo B Vilakazi
(74) *Attorney, Agent, or Firm* — Duft & Bornsen, PC

(57) ABSTRACT

A fuel injection control apparatus including a microprocessor. The microprocessor is configured to perform calculating a target injection time, determining a first crank angle defining a start of fuel injection and a second crank angle defining an end of fuel injection, controlling a fuel injector in an injection start priority mode in which the fuel is injected for the first target injection time from a first time point corresponding to the first crank angle or an injection end priority mode in which the fuel is injected for the second target injection time from a second time point corresponding to a target crank angle, and the controlling including controlling the fuel injector so as to inject the fuel in the injection start priority mode or the injection end priority mode in accordance with an injection mode.

15 Claims, 9 Drawing Sheets

FUEL INJECTION CONTROL APPARATUS

CROSS-REFERENCE TO RELATED APPLICATION

This application is based upon and claims the benefit of priority from Japanese Patent Application No. 2020-065397 filed on Mar. 31, 2020, the content of which is incorporated herein by reference.

BACKGROUND OF THE INVENTION

Field of the Invention

This invention relates to a fuel injection control apparatus for controlling an injection timing of a fuel in a direct-injection internal combustion engine.

Description of the Related Art

As this type of apparatuses, there have been known apparatuses that control the energization of an injector using a step-up voltage generated by a booster so that the injector injects fuel in the target amount. Such an apparatus is described in, for example, Japanese Unexamined Patent Publication No. 2020-016154 (JP2020-016154A). The apparatus of JP2020-016154A controls the injection timing so that the next injection is started at a predetermined interval after an injector starts to inject fuel.

However, the injection time for injecting the fuel in the target amount may vary with changes in the pressure, temperature, or the like of the fuel. For this reason, in the case of apparatuses that inject fuel while controlling the injection start timing, such as JP2020-016154A, the injection end time point may be delayed, resulting in an adverse effect on the combustion performance.

SUMMARY OF THE INVENTION

An aspect of the present invention is a fuel injection control apparatus for an internal combustion engine, the internal combustion engine including a piston reciprocating in a cylinder and a fuel injector arranged to inject a fuel into a combustion chamber facing the piston in the cylinder. The apparatus includes an air amount detector configured to detect an amount of an air flowing into the cylinder or a physical quantity having a correlation with the amount of the air, and an electronic control unit having a microprocessor and a memory. The microprocessor is configured to perform: calculating a target injection time of the fuel including a first target injection time and a second target injection time, based on the amount of the air or the physical quantity detected by the air amount detector; determining a first crank angle at which a fuel injection by the fuel injector is to be started and a second crank angle at which the fuel injection is to be ended; controlling the fuel injector so as to inject the fuel in an injection start priority mode in which the fuel is injected for the first target injection time from a first time point corresponding to the first crank angle or an injection end priority mode in which the fuel is injected for the second target injection time from a second time point corresponding to a target crank angle, the target crank angle being obtained by decreasing a crank angle range corresponding to the second target injection time from the second crank angle; and switching an injection mode to one of a plurality of injection modes in accordance with an operating state of the internal combustion engine, an injection frequency and an injection timing being determined in accordance with each of the plurality of injection modes, and wherein the microprocessor is configured to perform the controlling including controlling the fuel injector so as to inject the fuel in the injection frequency and the injection timing in accordance with the injection mode, and further inject the fuel in the injection start priority mode or the injection end priority mode in accordance with the injection mode.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 11. A fuel injection control apparatus according to the embodiment of the present invention is applied to vehicles including a direct-injection gasoline engine as an internal combustion engine. Specifically, this fuel injection control apparatus is applied to engine vehicles that travel using only an engine as a drive source and hybrid vehicles that travel using an engine and a motor as drive sources. Hereafter, an example will be described in which this fuel injection control apparatus is applied to a hybrid vehicle.

Figure 1:
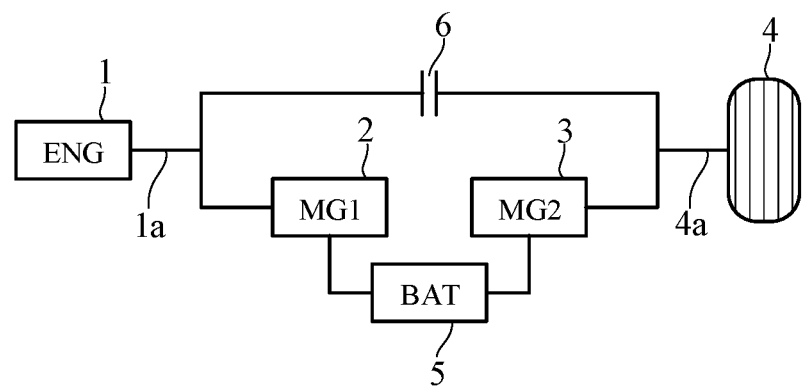
FIG. 1 is a drawing schematically showing the configuration of a travel drive unit of a hybrid vehicle including an internal combustion engine to which a fuel injection control apparatus according to an embodiment of the present invention is applied.

FIG. 1 is a drawing schematically showing the configuration of the travel drive unit of the hybrid vehicle including the internal combustion engine, i.e., the engine to which the fuel injection control apparatus according to the embodiment of the present invention is applied. As shown in FIG. 1, a first motor-generator (MG1) 2 is connected to the output shaft 1a of an engine (ENG) 1, and a second motor-generator (MG2) 3 is connected to the rotation shaft 4a of a drive wheel 4. The first motor-generator 2 mainly serves as a generator that generates power when driven by the engine 1, and the power generated by the first motor-generator 2 is accumulated in a battery (BAT) 5 through an inverter (not shown). The second motor-generator 3 mainly serves as a travel motor that is driven by power supplied from the battery 5 through an inverter (not shown).

A clutch 6 is interposed between the output shaft 1a of the engine 1 and the rotation shaft 4a of the drive wheel 4, and the output shaft 1a and rotation shaft 4a are connected or disconnected through the clutch 6. When the output shaft 1a and rotation shaft 4a are disconnected, the vehicle travels by only the power of the second motor-generator 3 (EV travel). When the output shaft 1a and rotation shaft 4a are connected through the clutch 6, the vehicle travels by only the power of the engine 1 (engine travel) or travels by the power of the engine 1 and second motor-generator 3 (hybrid travel). In other words, the vehicle is able to switch the travel mode among an EV mode, in which EV travel is performed, an engine mode, in which engine travel is performed, and a hybrid mode, in which hybrid travel is performed.

Figure 2:
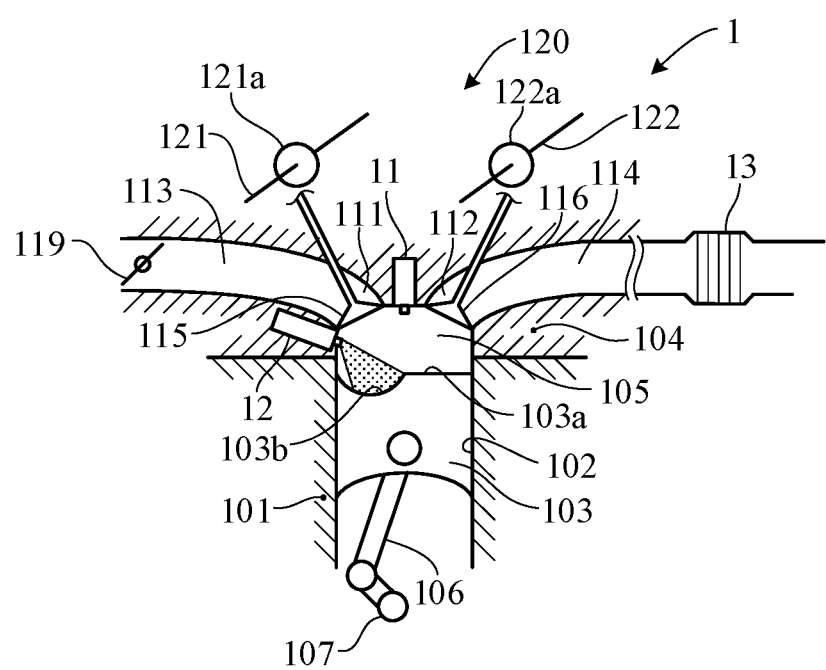
FIG. 2 is a drawing schematically showing a configuration of main components of an engine of FIG. 1.

FIG. 2 is a drawing schematically showing the configuration of main components of the engine 1. The engine 1 is a spark-ignition internal combustion engine having a fuel cut function of stopping supply of fuel to multiple cylinders during deceleration or the like of the vehicle and is a four-stroke engine, which goes through four strokes consisting of intake, compression, expansion and exhaust in one operation cycle. For convenience, the operation from the start of the intake stroke to the end of the exhaust stroke is referred to as "one cycle of the combustion of the engine," or simply as "one cycle." Although the engine 1 includes multiple cylinders, such as four, six, or eight ones, the configuration of one cylinder is shown in FIG. 2. The cylinders have the same configuration.

As shown in FIG. 2, the engine 1 includes a cylinder 102 formed in a cylinder block 101, a piston 103 disposed slidably in the cylinder 102, and a combustion chamber 105 formed between the crown surface 103a of the piston 103 (piston crown surface) and a cylinder head 104. For example, a recess 103b is formed in the piston crown surface 103a so as to be along a tumble flow in the cylinder. The piston 103 is connected to a crankshaft 107 through a connecting rod 106 and rotates the crankshaft 107 (corresponding to the output shaft 1a of FIG. 1) by reciprocating of the piston 103 along the inner wall of the cylinder 102.

The cylinder head 104 is provided with an intake port 111 and an exhaust port 112. An intake passage 113 communicates with the combustion chamber 105 through the intake port 111, while an exhaust passage 114 communicates with the combustion chamber 105 through the exhaust port 112. The intake port 111 is opened and closed by an intake valve 115, and the exhaust port 112 is opened and closed by an exhaust valve 116. A throttle valve 119 is disposed on the upstream side of the intake passage 113 connected to the intake valve 115. The throttle valve 119 consists of, for example, a butterfly valve, and the amount of intake air supplied to the combustion chamber 105 is controlled by the throttle valve 119. The intake valve 115 and exhaust valve 116 are open and close driven by a valve train 120.

An ignition plug 11 and a direct-injection injector 12 are mounted on the cylinder head 104 so as to face the combustion chamber 105. The ignition plug 11 is disposed between the intake port 111 and exhaust port 112 and ignites a fuel-air mixture in the combustion chamber 105 by producing a spark by electrical energy.

The injector 12 is disposed near the intake valve 115. The injector 12 includes a drive portion such as an electromagnetic actuator and piezo actuator, and injects fuel when driven by electrical energy. More specifically, the high-pressure fuel is supplied from a fuel tank to the injector 12 through a fuel pump, and the injector 12 converts the fuel into high fine particles and injects the resulting fuel into the combustion chamber 105 obliquely downward at a predetermined timing. The injector 12 may be disposed otherwise and may be disposed, for example, near the ignition plug 11.

The valve train 120 includes an intake cam shaft 121 and an exhaust cam shaft 122. The intake cam shaft 121 integrally includes intake cams 121a corresponding to the cylinders (cylinders 102), and the exhaust cam shaft 122 integrally includes exhaust cams 122a corresponding to the cylinders. The intake cam shaft 121 and exhaust cam shaft 122 are connected to the crankshaft 107 through timing belts (not shown) and rotate once each time the crankshaft 107 rotates twice.

The intake valve 115 is opened and closed by rotation of the intake cam shaft 121 through an intake rocker arm (not shown) at a predetermined timing corresponding to the profile of the intake cam 121a. The exhaust valve 116 is opened and closed by rotation of the exhaust cam shaft 122 through an exhaust rocker arm (not shown) at a predetermined timing corresponding to the profile of the exhaust cam 122a.

A catalyst device 13 for purifying exhaust gas is disposed on the exhaust passage 114. The catalyst device 13 is a device including a three-way catalyst having a function of removing and purifying HC, CO, and NOx contained in exhaust gas by oxidation and reduction. Other types of catalyst, such as an oxidation catalyst that oxidizes CO and HC in exhaust gas, may be used. When the temperature of the catalyst included in the catalyst device 13 is increased, the catalyst is activated, resulting in an increase in the exhaust gas purification effect of the catalyst device 13.

To improve fuel efficiency, the engine 1 has a fuel cut function of stopping fuel injection from the injector 12 when predetermined fuel cut conditions are satisfied during engine travel. That is, when the fuel cut conditions are satisfied, the mode is switched (referred to as the "F/C mode") and thus fuel injection is stopped. For example, the fuel cut conditions are as follows: the manipulated variable of the accelerator pedal (accelerator opening) is equal to or smaller than a predetermined value; the rotational speed of the crankshaft 107 (engine speed) is equal to or greater than a predetermined value; and the vehicle speed is equal to or greater than a predetermined value. These fuel cut conditions are satisfied, for example, during deceleration travel. In the F/C mode, intake of air into the combustion chamber 105 is continued.

Also, to improve fuel efficiency, the engine 1 has an idling stop function of stopping fuel injection from the injector 12 when predetermined idling stop conditions are satisfied. Specifically, when the idling stop conditions are satisfied, the mode is switched to an idling stop mode (referred to as the "I/S mode") and thus fuel injection is stopped. For example, the idling stop conditions are as follows: the vehicle speed is equal to or lower than a predetermined vehicle speed during a stop or the like of the vehicle; the accelerator pedal is not in operation; and the operation of a brake pedal is detected. In the I/S mode, the engine 1 is stopping, and intake of air into the combustion chamber 105 is stopped, as during EV travel.

Although not shown, the engine 1 includes an exhaust gas recirculator that recirculates a part of exhaust gas to an intake system, a blow-by gas return device that returns blow-by gas to the intake system and burns it again, a purge controller that controls supply of evaporative fuel gas in a fuel tank to the intake system, and the like. The exhaust gas recirculator includes an internal EGR that recirculates exhaust gas in the combustion chamber 105 under the control of the valve train 120 and an external EGR that guides a part of exhaust gas from the exhaust passage 114 to the intake system through an EGR passage and an EGR valve. The purge controller includes a purge passage through which evaporative fuel gas in the fuel tank is guided to the intake system and a purge valve that is disposed on the purge passage and controls the flow of gas passing through the purge passage. The engine 1 may include a supercharger.

Figure 3:
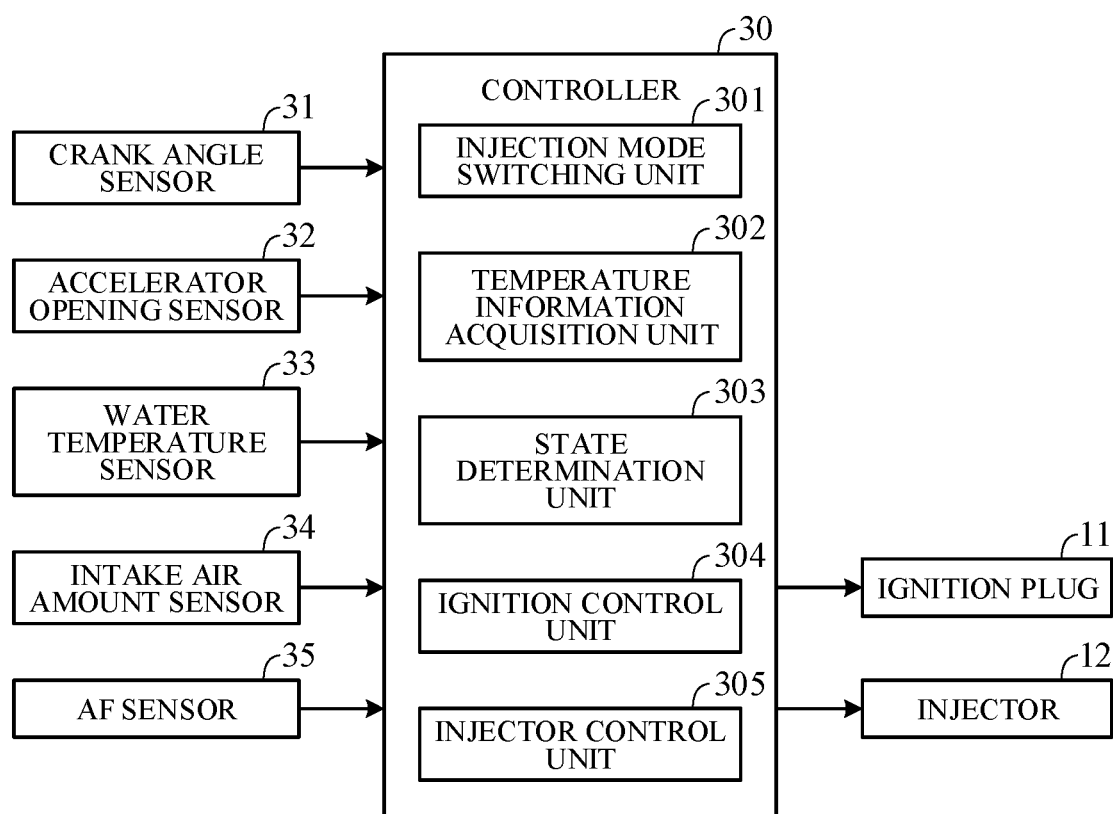
FIG. 3 is a block diagram showing the configuration of main components of an internal combustion engine control apparatus to which the fuel injection control apparatus according to the embodiment of the present invention is applied.

The above engine 1 is controlled by an internal combustion engine control apparatus. FIG. 3 is a block diagram showing the configuration of main components of the internal combustion engine control apparatus according to the embodiment of the present invention. As shown in FIG. 3, the internal combustion engine control apparatus is formed centered on a controller 30 for controlling the engine and includes various types of sensors, actuators, and the like connected to the controller 30. Specifically, a crank angle sensor 31, an accelerator opening sensor 32, a water temperature sensor 33, an intake air amount sensor 34, an AF sensor 35, the ignition plug 11, and the injector 12 are connected to the controller 30.

The crank angle sensor 31 is disposed on the crankshaft 107 and configured to output pulse signals in association with rotation of the crankshaft 107. More specifically, the crank angle sensor 31 output pulse signals every time the crank shaft 10 rotates by a predetermined angle (e.g., 30°). The controller 30 identifies the rotation angle of the crankshaft 107 (crank angle) with respect to the position of the top dead center (TDC) of the piston 103 at the start of the intake stroke and calculates the engine RPM (engine speed) on the basis of pulse signals from the crank angle sensor 31.

The accelerator opening sensor 32 is disposed on the acceleration pedal (not shown) of the vehicle and detects the manipulated variable of the acceleration pedal (accelerator opening). A command indicating the target torque of the engine 1 is issued on the basis of the value detected by the accelerator opening sensor 32. The water temperature sensor 33 is disposed on a passage through which engine cooling water for cooling the engine 1 flows and detects the temperature of the engine cooling water (cooling water temperature). The intake air amount sensor 34 is a sensor that detects the amount of intake air and consists of, for example, an air flow meter disposed on the intake passage 113 (more specifically, on the upstream side of the throttle valve). The AF sensor 35 is disposed on the exhaust passage 114 and on the upstream side of the catalyst device 13 and detects the air-fuel ratio of exhaust gas in the exhaust passage 114. Although not shown, a variety of sensors such as an intake air pressure sensor, atmospheric pressure sensor and intake air temperature other than the above sensors are connected to the controller 30.

The controller 30 consists of an electronic control unit (ECU) and includes a computer including an arithmetic processing unit, such as a CPU, a storage unit, such as a ROM or RAM, and other peripheral circuits. The controller 30 includes, as functional elements, an injection mode switching unit 301, a temperature information acquisition unit 302, a state determination unit 303, an ignition control unit 304, and an injector control unit 305.

Figure 4:
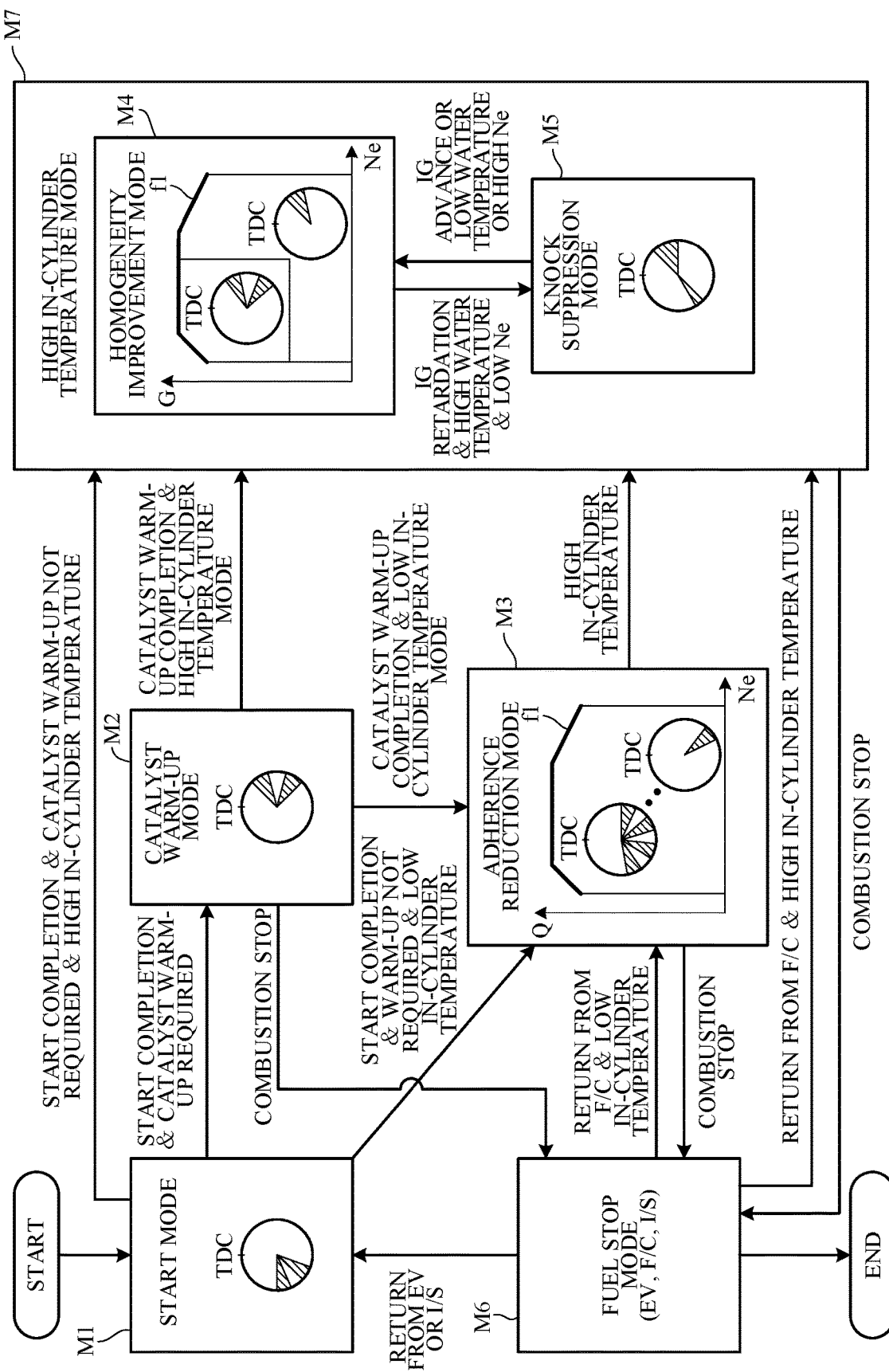
FIG. 4 is a diagram showing an example of switching of injection modes in the internal combustion engine control apparatus of FIG. 3.

The injection mode switching unit 301 switches the injection mode in accordance with the operation state of the engine 1. FIG. 4 is a diagram showing an example of switching of the injection mode in the period from when the operation of the engine 1 is started in response to turn-on of an ignition switch until the operation of the engine 1 is ended in response to turn-off of the ignition switch. As shown in FIG. 4, the injection mode includes a start mode M1, a catalyst warm-up mode M2, an adherence reduction mode M3, a homogeneity improvement mode M4, a knock suppression mode M5, and a fuel stop mode M6. The homogeneity improvement mode M4 and knock suppression mode M5 represent high in-cylinder temperature states, in which the piston temperature (in-cylinder temperature) is high, and are collectively referred to as the "high in-cylinder temperature mode M7."

In the modes M1 to M5 other than the fuel stop mode in FIG. 4, the crank angle in a range from the start of the intake stroke (the intake top dead center (TDC)) to the end of the compression stroke (the compression top dead center (TDC)) is represented by the angle of a clockwise circle using the intake top dead center (TDC) as the start point, and the fuel injection timing is represented by a hatched sector extending radially from the center of the circle. In the intake stroke, the crank angle is in a range equal to or greater than 0° and equal to or smaller than 180°; in the compression stroke, the crank angle is in a range equal to or greater than 180° and equal to or smaller than 360. Hereafter, a crank angle range from 0° to 90° may be referred to as the first half of the intake stroke, a crank angle range from 90° to 180° as the second half of the intake stroke, a crank angle range from 180° to 270° as the first half of the compression stroke, and a crank angle range from 270° to 360° as the second half of the compression stroke.

The start mode M1 is a mode for starting the engine 1 and is performed immediately after the ignition switch is turned on, or when the mode is restored from the EV mode or I/S mode. In the start mode M1, the engine 1 is cranked and then a mixture is produced by injecting the fuel twice in the first half of the compression stroke, that is, by two-injection compression, as shown in FIG. 4. In this case, the same amount of fuel is injected each time. By injecting the fuel in the compression stroke, the startability of the engine 1 is improved. Also, by injecting the fuel multiple times (in multiple stages) in the first half of the compression stroke, the amount of each fuel injection is suppressed. This allows for suppressing adherence of the fuel to the piston crown surface 103a or the wall surface of the cylinder 102 and thus suppressing soot formation.

As long as both an improvement in the startability and suppression of soot are achieved, the start mode M1 is not limited to two-injection compression and may be an injection in a different injection pattern, such as one in which the fuel is injected once in the compression stroke (one-injection compression) or one in which the fuel is injected multiple times in the intake stroke and compression stroke (multiple-injection intake-compression). When the start mode M1 is complete, the injection mode is switched to one of the catalyst warm-up mode M2, adherence reduction mode M3, and high in-cylinder temperature mode M7 (e.g., homogeneity improvement mode M4).

The catalyst warm-up mode M2 is a mode for promoting warm-up of the catalyst device 13 to activate the catalyst earlier. In the catalyst warm-up mode M2, a mixture is produced by injecting the fuel twice in the intake stroke, that is, by two-injection intake, as shown in FIG. 4. In this case, the same amount of fuel is injected each time. Also, in the catalyst warm-up mode M2, the timing at which the mixture is ignited by the ignition plug 11 is retarded from the MBT (minimum advance for the best torque), at which the best torque is obtained. The retardation of the ignition timing causes the mixture to be burnt later and thus increases the amount of air supplied to the combustion chamber 105 for generating the target torque and the amount of fuel injection. This increases the amount of heat generated by combustion of the mixture and thus warms up the catalyst device 13 earlier. In the catalyst warm-up mode M2, the fuel is injected at a predetermined timing that is previously stored in the memory and that is not changed in accordance with the engine RPM (engine speed) or the amount of intake air.

By injecting the fuel by two-injection intake in the catalyst warm-up mode M2, the mixture is homogenized, resulting in an increase in the combustion efficiency and suppression of emission deterioration. As long as emission deterioration is suppressed, the catalyst warm-up mode M2 is not limited to two-injection intake and may be an injection in a different injection pattern, such as one in which the fuel is injected once in the intake stroke (one-injection intake) or one in which the fuel is injected multiple times in the intake stroke and compression stroke (multiple-injection intake-compression). When the catalyst warm-up mode M2 is complete, the injection mode is switched to the adherence reduction mode M3 or high in-cylinder temperature mode M7 (e.g., homogeneity improvement mode M4).

The adherence reduction mode M3 is performed in order to reduce soot when the piston temperature is low. In the adherence reduction mode M3, the fuel is injected in an area other than a predetermined injection-prohibited area near the intake top dead center (TDC) at the start of the intake stroke and a predetermined injection-prohibited area near the compression top dead center (TDC) at the end of the compression stroke, that is, in an area in which the piston crown surface 103a is away from the injector 12 (injectable areas). For example, the injection-prohibited area is set in a part or almost all of the first half of the intake stroke and a part or almost all of the second half of the compression stroke.

More specifically, the injection-prohibited area is set in accordance with the engine speed. As the engine speed becomes higher, the piston crown surface 103a retreats from the injector 12 in the intake stroke at a higher speed and approaches the injector 12 in the compression stroke at a higher speed. For this reason, as the engine speed becomes higher, the injection-prohibited area in the intake stroke becomes narrower (the end of the injection-prohibited area is shifted to the advance side), and the injection-prohibited area in the compression stroke becomes wider (the start of the injection-prohibited area is shifted to the retard side).

Figure 5:
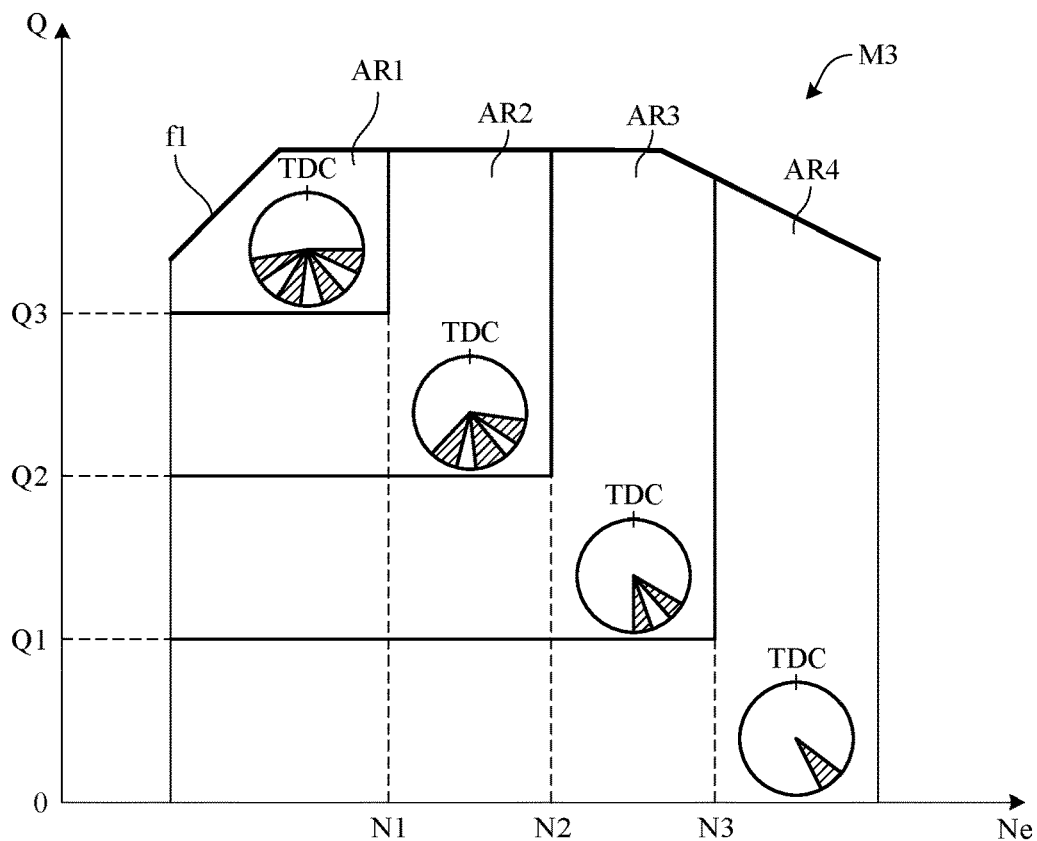
FIG. 5 is a diagram showing an example of an injection map corresponding to an adherence reduction mode of FIG. 4.

The fuel injection frequency and fuel injection timing in the injectable area are determined on the basis of a map previously stored in the memory, for example, a map shown in FIG. 5. Specifically, as shown in FIG. 5, the injection frequency and injection timing are determined on the basis of a predetermined map so as to be associated with a characteristic f1 of the maximum output torque corresponding to the engine speed Ne and the target amount of injection Q, as shown in FIG. 5, and the injection frequency is set to one to four times. If the injection frequency is multiple times, the same amount of fuel is injected each time. The target amount of injection Q is calculated as a value such that the actual air-fuel ratio becomes the target air-fuel ratio and is determined in accordance with the amount of intake air. For this reason, the map of FIG. 5 may be rewritten as a map of the engine speed Ne and the amount of intake air G, like the map of the homogeneity improvement mode M4 of FIG. 4.

To suppress adherence of the fuel to the piston crown surface 103a, it is preferred to reduce the amount of one injection by increasing the injection frequency. However, the minimum amount of one injection Qmin of the injector 12 is defined by the specification of the injector 12, and the injector 12 cannot inject the fuel in a smaller amount than the minimum amount of injection Qmin (MinQ constraint). Accordingly, the injection frequency is once in an area in which the target amount of injection is small, and is gradually increased to twice, three times, and four times as the target amount of injection Q is increased.

On the other hand, to increase the injection frequency, the injector 12 has to be driven at a higher speed. For this reason, for example, a capacitor in an injector driving electrical circuit of the controller 30 has to be repeatedly charged and discharged within a short time. In this case, the injector 12 has to be driven at a higher speed as the engine speed Ne becomes higher. Thus, the controller 30 bears a higher electrical load and generates a greater amount of heat. The injection frequency is limited due to this heat constraint of the controller 30 (ECU heat constraint). That is, while the injection frequency is four times in an area in which the engine speed Ne is low, the injection frequency is gradually limited to three times, twice, and once as the engine speed Ne is increased.

In view of the foregoing, for example, the injection frequency is set to four times (four-stage injection) in an area AR1 in which the engine speed Ne is smaller than a predetermined value N1 and the target amount of injection Q is equal to or greater than a predetermined value Q3; the injection frequency is set to three times (three-stage injection) in an area AR2 in which the engine speed Ne is smaller than a predetermined value N2 and the target amount of injection Q is equal to or greater than a predetermined value Q2, except for the area AR1; the injection frequency is set to twice (two-stage injection) in an area AR3 in which the engine speed Ne is smaller than a predetermined value N3 and the target amount of injection Q is equal to or greater than a predetermined value Q1, except for the areas AR1 and AR2; and the injection frequency is set to once (single injection) in an area AR4 in which the engine speed Ne is equal to or greater than the predetermined value N3 or the target amount of injection Q is smaller than the predetermined value Q1.

The predetermined values N1 to N3 have a relationship of N1<N2<N3, and the predetermined values Q1 to Q3 have a relationship of Q1<Q2<Q3. The predetermined values N1 to N3 and Q1 to Q3 are previously determined through an experiment and stored in the memory. The maximum injection frequency in the adherence reduction mode M3 is determined on the basis of the specification of the injector 12, controller 30, or the like, the mounting position of the injector 12, or the like and may be smaller or greater than four times. When the adherence reduction mode is complete, the injection mode is switched to the high in-cylinder temperature mode M7 (e.g., homogeneity improvement mode M4) or fuel stop mode M6.

The homogeneity improvement mode M4 is an injection mode in which fuel efficiency is optimized. In the homogeneity improvement mode, the fuel is injected by one-injection intake or two-injection intake in accordance with a control map corresponding to the engine speed Ne and the amount of intake air G previously stored in the memory. Specifically, as shown in FIG. 4, the fuel is injected by two-injection intake in a high-load, low-rotation area in which the engine speed Ne is low and the amount of intake air G is large, while the fuel is injected by one-injection intake in an area in which the engine speed Ne is high or the amount of intake air G is small. This control map is changed in accordance with the cooling water temperature. In the case of two-injection intake, the same amount of fuel is injected each time. By injecting the fuel by one-injection intake or two-injection intake in the homogeneity improvement mode, the mixture in the combustion chamber 105 is homogenized by a tumble flow and thus fuel efficiency is increased.

Also, in the homogeneity improvement mode M4, the ignition timing of the ignition plug 11 is controlled mainly in accordance with the engine speed Ne and the amount of intake air G. Specifically, in an area in which knocks do not occur or are less likely to occur, the ignition timing is controlled to the optimum ignition timing, i.e., MBT that is closer to the advance side than the compression top dead center (TDC) and that is previously stored in the memory. On the other hand, in an area in which knocks occur or are more likely to occur, for example, in a high-load, low-rotation area in which the engine speed is low and the amount of intake air is large, the ignition timing is retarded from the MBT in accordance with a characteristic previously stored in the memory in order to suppress knocks. The ignition timing may be retarded by disposing a knock sensor that detects knocks and detecting knocks using the knock sensor. When predetermined knock suppression conditions are satisfied, the homogeneity improvement mode M4 is switched to the knock suppression mode M5.

The knock suppression mode M5 is an injection mode in which knocks are suppressed. In the knock suppression mode M5, the retarded ignition timing is returned (advanced) to the MBT side, and the fuel is injected once in the intake stroke (e.g., in the first half of the intake stroke) and once in the compression stroke (e.g., in the first half of the compression stroke) (multiple-injection intake-compression). In the compression stroke, the amount of injection is the minimum amount of injection Qmin; in the intake stroke, the amount of injection is an amount obtained by subtracting the minimum amount of injection Qmin from the target amount of injection Q. By injecting the fuel in the compression stroke, the temperature of end gas in the combustion chamber 105 is reduced by the latent heat of vaporization. Thus, knocks are suppressed while the amount of retardation of the ignition timing is suppressed. As a result, fuel efficiency is increased compared to when the ignition timing is retarded and the fuel is injected only in the intake stroke. When the knock suppression node is complete, that is, when the knock suppression conditions become unsatisfied, the injection mode is switched to the homogeneity improvement mode. That is, when the in-cylinder temperature is high (the injection mode is the high in-cylinder temperature mode M7), the injection mode is switched between the homogeneity improvement mode M4 and knock suppression mode M5 in accordance with whether the knock suppression conditions are satisfied.

The fuel stop mode M6 is a mode in which fuel injection is stopped and thus combustion is stopped in the combustion chamber 105. When the travel mode is the EV mode, F/C mode, or I/S mode, the injection mode is switched to the fuel stop mode M6. For example, when combustion is stopped in the adherence reduction mode M3 or high in-cylinder temperature mode M7, the injection mode is switched to the fuel stop mode M6. When the fuel stop mode M6 is complete, the injection mode is switched to one of the start mode M1, adherence reduction mode M3, and high in-cylinder temperature mode M7.

The temperature information acquisition unit 302 of FIG. 3 acquires information on the temperature in the cylinder 102. This temperature information is information on the in-cylinder temperature, which influences adherence of the fuel in the cylinder 102, and corresponds to the temperature of the piston crown surface 103a. For this reason, if a sensor capable of accurately detecting the temperature of the piston crown surface 103a is disposed, the temperature information acquisition unit 302 would only have to acquire information from that sensor. However, the piston crown surface 103a reciprocates in the cylinder 102 so as to face the combustion chamber 105 having a high temperature and therefore it is difficult to directly accurately detect the temperature of the piston crown surface 103a using such a sensor.

On the other hand, the temperature of the piston crown surface 103a has a correlation with the amount of intake air G supplied into the combustion chamber 105 for combustion in the combustion chamber 105. Specifically, when the cumulative amount of the amounts of intake air G is increased, a larger amount of heat is generated in the combustion chamber 105 and thus the temperature of the piston crown surface 103a corresponding to the in-cylinder temperature is increased. For this reason, the temperature information acquisition unit 302 acquires signals from the intake air amount sensor 34 and calculates the cumulative amount of the amounts of intake air G on the basis of the acquired signals.

Figure 6:
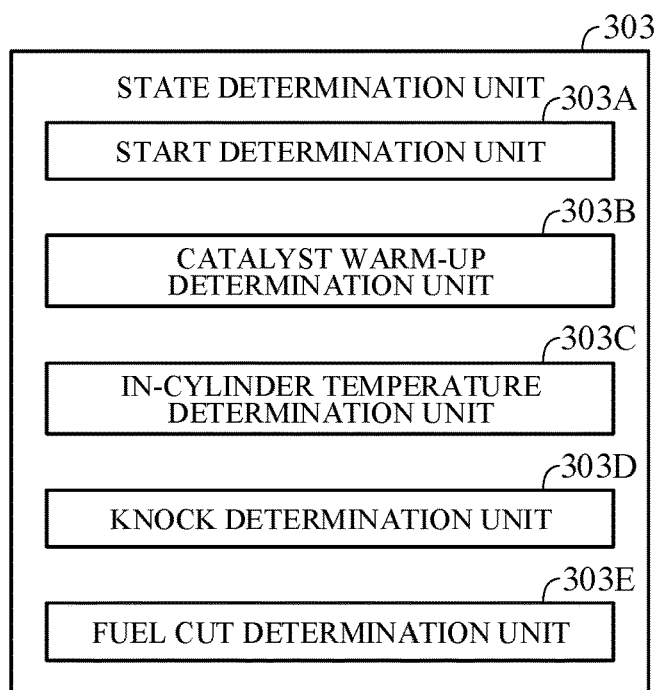
FIG. 6 is a block diagram showing a functional configuration of a state determination unit of FIG. 3.

The state determination unit 303 determines the operation state of the engine 1 related to switching of the injection mode. FIG. 6 is a block diagram showing the functional elements of the state determination unit 303. As shown in FIG. 6, the state determination unit 303 includes a start determination unit 303A, a catalyst warm-up determination unit 303B, an in-cylinder temperature determination unit 303C, a knock determination unit 303D, and a fuel cut determination unit 303E.

In the start mode M1 of FIG. 4, the start determination unit 303A determines whether the start of the engine 1 is complete. Specifically, the start determination unit 303A determines whether the start of the engine 1 is complete, on the basis of whether a predetermined count value has been counted after the rotational speed of the cranked engine calculated on the basis of signals from the crank angle sensor 31 is increased to the complete explosion rotational speed, at which the engine is able to maintain rotation on its own. If the start determination unit 303A determines that the start of the engine 1 is complete, the injection mode switching unit 301 switches the injection mode from the start mode M1 to the catalyst warm-up mode M2, adherence reduction mode M3, or high in-cylinder temperature mode M7 (e.g., homogeneity improvement mode M4).

The start determination unit 303A determines not only whether the start of the engine 1 is complete, but also whether the engine 1 needs to be started. Specifically, in the fuel stop mode M6 of FIG. 4, the start determination unit 303A determines whether the travel mode needs to be switched from the EV mode to the engine mode or hybrid mode and whether the travel mode needs to be restored from the I/S mode. If the start determination unit 303A determines that the travel mode needs to be switched to the engine mode or that the travel mode needs to be restored from the I/S mode, the injection mode switching unit 301 switches the injection mode from the fuel stop mode M6 to the start mode M1.

In the catalyst warm-up mode M2 of FIG. 4, the catalyst warm-up determination unit 303B determines whether warm-up of the catalyst device 13 (catalyst warm-up) is complete. This determination is a determination as to whether the total workload of the engine 1 has reached the target total workload required for catalyst warm-up. The target total workload is set in accordance with the cooling water temperature detected by the water temperature sensor 33 at the start of the engine 1 using a previously stored relational expression, characteristic, or map. For example, when the cooling water temperature is low, it takes time to warm up the catalyst, since the engine 1 has yet to be warmed up. In view of the foregoing, the target total workload is set to a larger value as the cooling water temperature is lower.

The catalyst warm-up determination unit 303B first calculates the total workload of the engine 1 corresponding to the cooling water temperature on the basis of signals from the water temperature sensor 33. Subsequently, when the total workload reaches the target total workload, the catalyst warm-up determination unit 303B determines that the catalyst warm-up is complete. Thus, the injection mode switching unit 301 switches the injection mode from the catalyst warm-up mode M2 to the adherence reduction mode M3 or high in-cylinder temperature mode M7 (e.g., homogeneity improvement mode M4).

Also, in the start mode M1 of FIG. 4, the catalyst warm-up determination unit 303B determines whether catalyst warm-up is needed. For example, when the cooling water temperature is high due to restoration from the EV travel, or the like, the catalyst warm-up determination unit 303B sets the target total workload to 0 and determines that catalyst warm-up is not needed. In this case, the injection mode switching unit 301 switches the injection mode from the start mode M1 to the adherence reduction mode M3 or high in-cylinder temperature mode M7 (e.g., homogeneity improvement mode M4). On the other hand, if, in the start mode M1, the catalyst warm-up determination unit 303B sets the target total workload to a value greater than 0 and determines that catalyst warm-up is needed, the injection mode switching unit 301 switches the injection mode from the start mode M1 to the catalyst warm-up mode M2.

The in-cylinder temperature determination unit 303C determines whether the in-cylinder temperature corresponding to the temperature of the piston crown surface 103a is equal to or greater than a predetermined value (e.g., 100° C.), on the basis of the cumulative amount of the amounts of intake air G acquired by the temperature information acquisition unit 302. That is, the in-cylinder temperature determination unit 303C determines whether the in-cylinder temperature is a high in-cylinder temperature equal to or greater than the predetermined value or a low in-cylinder temperature smaller than the predetermined value. In each of the start mode M1, catalyst warm-up mode M2, and fuel stop mode M6 of FIG. 4, the in-cylinder temperature determination unit 303C determines whether the in-cylinder temperature is a high in-cylinder temperature.

In the homogeneity improvement mode M4 of FIG. 4, the knock determination unit 303D determines whether the knock suppression conditions are satisfied. This determination is a determination as to whether the amount of retardation of the ignition timing for suppressing knocks has become equal to or greater than a predetermined value and is a determination as to whether the injection mode needs to be switched to the mode in which knocks are suppressed. When the engine rotational speed (engine speed) is high and when the cooling water temperature is low, knocks are less likely to occur. From this viewpoint, the knock suppression conditions are as follows: the amount of retardation of the ignition timing from the MBT is equal to or greater than a predetermined value; the cooling water temperature is equal to or greater than a predetermined value; and the engine speed is equal to or smaller than a predetermined value. If the knock determination unit 303D determines that the knock suppression conditions are satisfied, the injection mode switching unit 301 switches the injection mode from the homogeneity improvement mode M4 to the knock suppression mode M5.

If, in the knock suppression mode M5, the knock determination unit 303D determines that the knock suppression conditions are unsatisfied, the injection mode switching unit 301 switches the injection mode from the knock suppression mode M5 to the homogeneity improvement mode M4. The injection mode may be switched from the adherence reduction mode M3 to the knock suppression mode M5 without going through the homogeneity improvement mode M4. Specifically, if, in the adherence reduction mode M3, the in-cylinder temperature determination unit 303C determines that the in-cylinder temperature is high, the injection mode may be switched to the knock suppression mode M5.

The fuel cut determination unit 303E determines whether fuel cut is needed in each of the catalyst warm-up mode M2, adherence reduction mode M3, and high in-cylinder temperature mode M7 of FIG. 4. In other words, the fuel cut determination unit 303E determines whether the travel mode needs to be switched to the EV mode, F/C mode, or I/S mode. If the fuel cut determination unit 303E determines that fuel cut is needed, the injection mode switching unit 301 switches the injection mode from the catalyst warm-up mode M2, adherence reduction mode M3, or high in-cylinder temperature mode M7 to the fuel stop mode M6.

The ignition control unit 304 of FIG. 3 outputs control signals to the ignition plug 11 so that the ignition timing becomes the target ignition timing according to a map or characteristic corresponding to the operation state previously stored in the memory. For example, in the catalyst warm-up mode M2, the ignition control unit 304 outputs control signals to the ignition plug 11 so that the ignition timing is retarded from the MBT. In the homogeneity improvement mode M4, the ignition control unit 304 outputs control signals to the ignition plug 11 so that the ignition timing becomes the MBT or is retarded to suppress knocks. In the knock suppression mode M5, the ignition control unit 304 outputs control signals to the ignition plug 11 so that the retarded ignition timing is returned (advanced) to the MBT side.

The injector control unit 305 calculates the target amount of injection per cycle in accordance with the amount of intake air detected by the intake air amount sensor 34 while performing feedback control so that the actual air-fuel ratio detected by the AF sensor 35 becomes the target air-fuel ratio (e.g., a theoretical air-fuel ratio). The injector control unit 305 then calculates the target amount of one injection (the unit target amount of injection) corresponding to the injection mode of FIG. 4 and outputs control signals to the injector 12 so that the injector 12 injects the fuel in the unit target amount at a predetermined timing.

Figure 7:
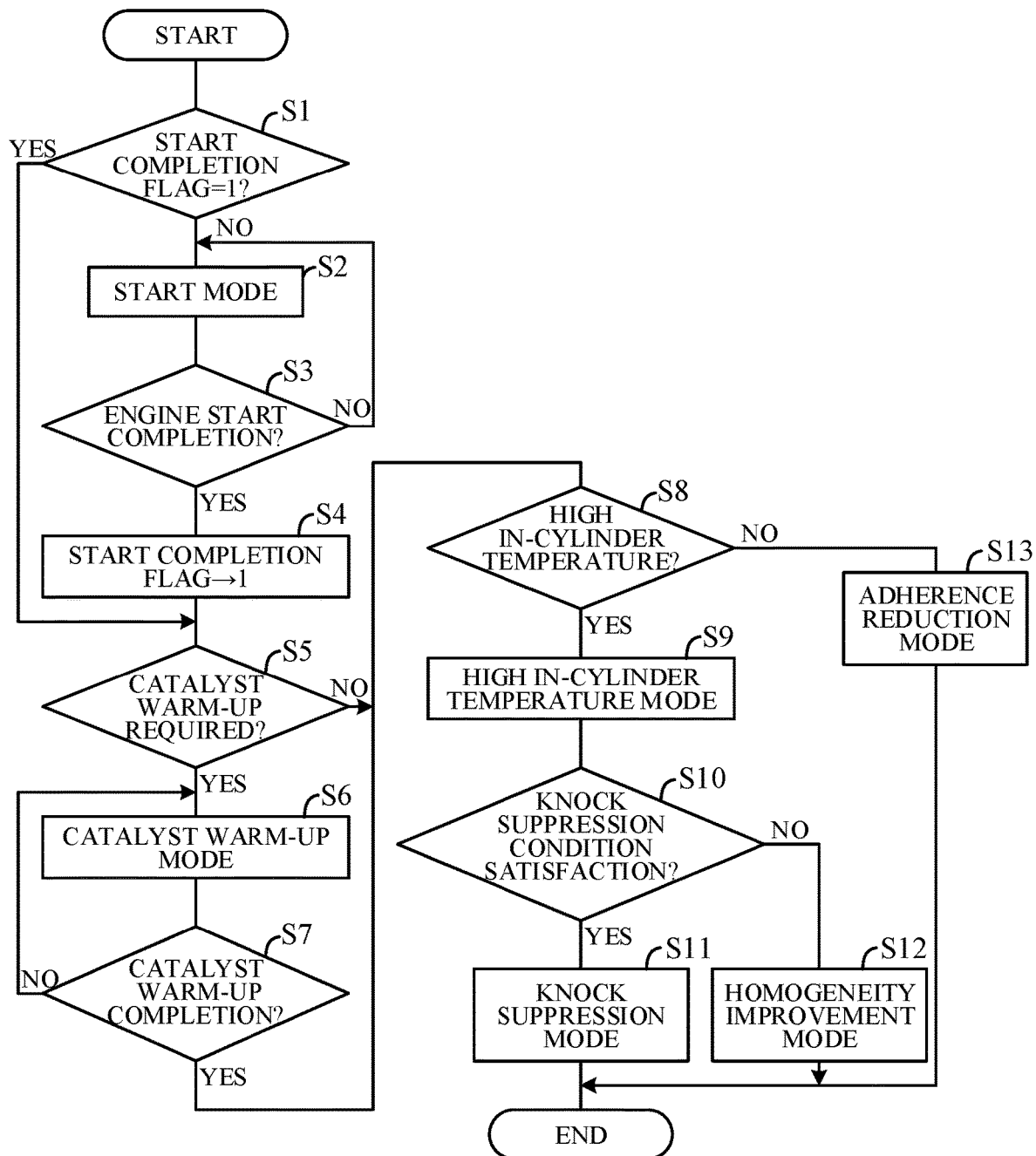
FIG. 7 is a flowchart showing an example of a process performed by a controller in FIG. 3.

FIG. 7 is a flowchart showing an example of a process performed by the controller 30 in accordance with a program previously stored in the memory and, more specifically, an example of a process related to switching of the injection mode. For example, the process shown in this flowchart is started when a command to start the engine 1 is issued in response to turn-on of the ignition switch, and repeated in a predetermined cycle. FIG. 7 does not show a process related to switching from the fuel stop mode M6 of FIG. 4 to any other injection mode or a process related to switching from any other injection mode to the fuel stop mode M6.

As shown in FIG. 7, first, in S1 (5: a process step), the controller 30 determines whether a start completion flag is 1. The start completion flag is 0 at the initial time and is set to 1 when the start of the engine 1 is complete in the start mode M1. If the determination in S1 is NO, the process proceeds to S2; if the determination in S1 is YES, the process skips S2 to S4 and proceeds to S5. In S2, the injection mode is switched to the start mode.

Then, in S3, the controller 30 determines whether the start of the engine 1 is complete, that is, whether the engine speed has reached the complete explosion speed, on the basis of signals from the crank angle sensor 31. If the determination in S3 is YES, the process proceeds to S4; if the determination in S3 is NO, the process returns to S2. In S4, the controller 30 sets the start completion flag to 1.

Then, in S5, the controller 30 determines whether warm-up of the catalyst device 13 is needed, on the basis of whether the target total workload set on the basis of signals from the water temperature sensor 33 is 0. If the determination in S5 is YES, the process proceeds to S6; if the determination in S5 is NO, the process skips S6 and S7 and proceeds to S8. In S6, the controller 30 switches the injection mode to the catalyst warm-up mode M2. In S7, the controller 30 calculates the total workload of the engine 1 on the basis of signals from the intake air amount sensor 34, as well as determines whether catalyst warm-up is complete, on the basis of whether the total workload has reached the target total workload. If the determination in S7 is YES, the process proceeds to S8; if the determination in S7 is NO, the process returns to S6.

In S8, the controller 30 determines whether the in-cylinder temperature is equal to or greater than the predetermined value, that is, whether it is a high in-cylinder temperature, on the basis of the cumulative amount of the amounts of intake air G acquired from the temperature information acquisition unit 302. If the determination in S8 is YES, the process proceeds to S9 and the controller 30 switches the injection mode to the high in-cylinder temperature mode M7.

Then, in S10, the controller 30 determines whether the knock suppression conditions are satisfied, on the basis of the amount of retardation of the ignition timing from the MBT, the cooling water temperature detected by the water temperature sensor 33, and the engine speed detected by the crank angle sensor 31. If the determination in S10 is YES, the process proceeds to S11; if the determination in S10 is NO, the process proceeds to S12. In S11, the injection mode is switched to the knock suppression mode M5; in S12, the injection mode is switched to the homogeneity improvement mode M4. On the other hand, if the determination in S8 is NO, the process proceeds to S13 and the injection mode is switched to the adherence reduction mode M3.

The main operation of the above internal combustion engine control apparatus will be described more specifically. When the ignition switch is turned on, the fuel is injected by two-injection compression and the engine 1 is started (S2). If the cooling water temperature is low due to the first start of the engine 1, or the like, warm-up of the catalyst device 13 is needed and the fuel is injected by two-injection intake (S6). Thus, the ignition timing is retarded from the MBT so that the mixture is burnt later, allowing the catalyst device 13 to be warmed up earlier.

After the warm-up of the catalyst device 13 is complete (e.g., immediately after completion of the warm-up following the first start of the engine 1), the in-cylinder temperature may have yet to be increased to a predetermined temperature (e.g., 100° C.) required to reduce adherence of soot to the piston crown surface 103*a*. In this case, the fuel is injected in accordance with the map of FIG. 5 in a range from the second half of the intake stroke to the first half of compression stroke so that a reduction in adherence of soot is preferentially performed (S13). Thus, for example, the fuel is injected four times in a high-load, low-rotation area AR1. As a result, the amount of one fuel injection of the injector 12 is reduced and thus adherence of the fuel is effectively suppressed.

On the other hand, if the in-cylinder temperature after completion of the warm-up of the catalyst device 13 is equal to or greater than a predetermined temperature, soot is less likely to occur. This is because even if the fuel adheres to the piston crown surface 103*a*, the fuel instantly evaporates. In this case, the fuel is injected in the intake stroke (by two-injection intake or one-injection intake) (S12). Thus, the mixture in the combustion chamber 105 is homogenized, resulting in an increase in the combustion efficiency. The fuel is injected by two-injection intake also during catalyst warm-up. However, the above fuel injection in the intake stroke (at high in-cylinder temperature state) is performed at a timing different from that during catalyst warm-up.

If the knock suppression conditions are satisfied when the fuel is being injected in the intake stroke in a high in-cylinder temperature state, the fuel is injected in the intake stroke and the fuel of the minimum amount Qmin is also injected in the compression stroke (S11). Thus, the temperature of the mixture is reduced, resulting in suppression of knocks. As a result, the amount of retardation of the ignition timing for suppressing knocks is reduced, and the ignition timing approaches the MBT. Thus, the combustion efficiency is increased.

When the engine 1 is started due to restoration from the EV mode or I/S mode, or the like, the cooling water temperature may be sufficiently high. In this case, the injection mode is switched to the high in-cylinder temperature mode M7 (e.g., homogeneity improvement mode M4) or adherence reduction mode M3 (S5→S8→S9, S5→S8→S13) without warming up the catalyst device 13 after the start of the engine. Thus, efficient combustion is performed after the start of the engine while adherence of soot to the piston crown surface 103*a* is suppressed.

Given the above configuration, the fuel injection control apparatus according to the embodiment of the present invention will be described. To cause the injector 12 to inject the fuel, the injection pattern is determined in accordance with the injection mode switched by the injection mode switching unit 301, as described above. Also, the target injection time required to inject the fuel in the target amount corresponding to the amount of intake air or the like is calculated. Then, control signals are outputted to the injector 12 (to be more precise, the driver circuit of the injector 12) so that the fuel is injected for the target injection time from the target crank angle determined in accordance with the injection pattern.

However, the crank angle range corresponding to the injection time for injecting the fuel in the target amount varies with changes in the engine speed or the like. For this reason, if the fuel is always injected using the injection start time point as a reference, the injection end time point may be delayed. Thus, soot adherence, emission deterioration, or the like may occur and affect the combustion performance. In view of the foregoing, the fuel injection control apparatus according to the present embodiment is configured as follows.

Figure 8:
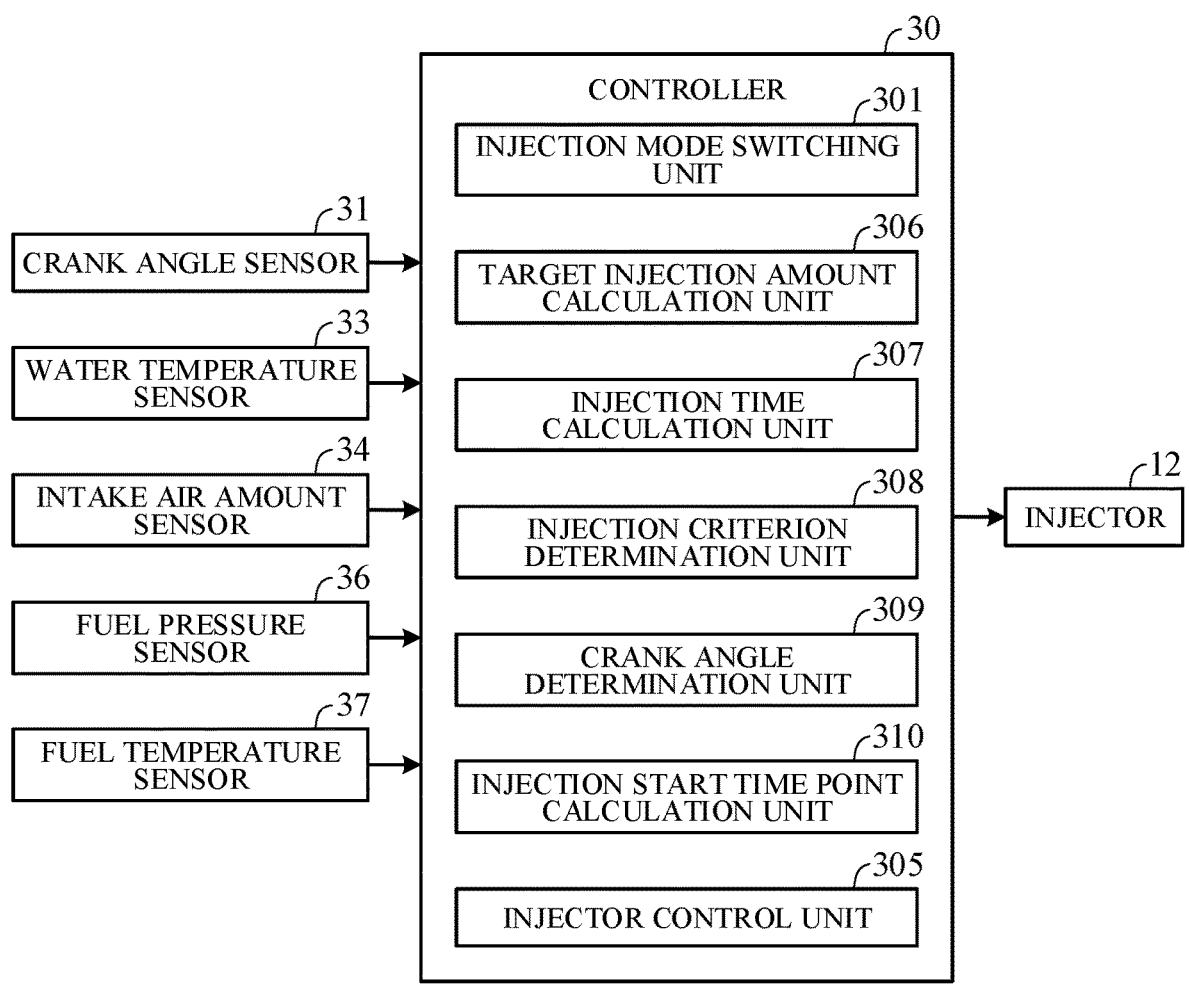
FIG. 8 is a block diagram showing a main configuration of the fuel injection control apparatus according to the embodiment of the invention.

FIG. 8 is a block diagram showing the configuration of main components of the fuel injection control apparatus according to the present embodiment. Some elements of this fuel injection control apparatus are the same as those of the control apparatus of FIG. 3 and are given the same reference signs. As shown in FIG. 8, the fuel injection control apparatus includes the controller 30, as well as the crank angle sensor 31, the water temperature sensor 33, the intake air amount sensor 34, a fuel pressure sensor 36, a fuel temperature sensor 37, and the injector 12 that are connected to the controller 30.

The fuel pressure sensor 36 is a sensor that detects the pressure of the high-pressure fuel supplied to the injector 12 through a fuel pump and is disposed on, for example, fuel piping. The fuel temperature sensor 37 is a sensor that detects the temperature of the fuel supplied to the injector 12 and is disposed on, for example, fuel piping. The controller 30 performs predetermined processing on the basis of signals from the sensors 31, 33, 34, 36, and 37 and outputs controls signals (drive current) to the injector 12 to open the valve of the injector 12.

Figure 9:
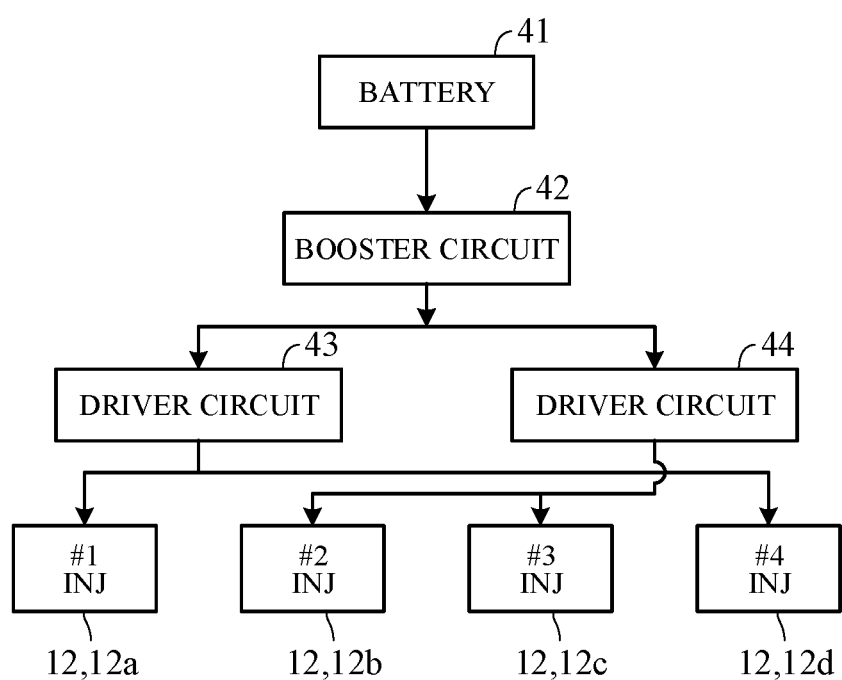
FIG. 9 is a diagram showing a flow of power supplied to an injector of FIG. 8.

FIG. 9 is a diagram schematically showing the flow of power supplied to the injector 12 and shows the flow of power in an inline-four engine, which is an example of the type of the engine 1. In the engine 1, a first cylinder #1 and a fourth cylinder #4, and a second cylinder #2 and a third cylinder #3 form pairs and are opposed to each other. These cylinders are ignited in the order of the first cylinder #1, third cylinder #3, fourth cylinder #4, and second cylinder #2 each time the crank angle is increased by 180°.

As shown in FIG. 9, power (voltage) from a vehicle-mounted battery 41 is boosted by a single booster circuit 42 including a capacitor. The boosted power is supplied to injectors 12a to 12d through a pair of driver circuits 43 and 44 as a drive current. Specifically, the drive current is supplied to the injector 12a of the first cylinder #1 and the injector 12d of the fourth cylinder #4 through the driver circuit 43 at different timings and is also supplied to the injector 12b of the second cylinder #2 and the injector 12c of the third cylinder #3 through the driver circuit 44 at different timings.

As seen above, the single booster circuit 42 is shared by the four injectors 12a to 12d and thus the number of booster circuits 42 can be reduced. Also, the pair of driver circuits 43 and 44 are shared by the injectors 12a and 12d and injectors 12b and 12c and thus the number of driver circuits 43 and 44 can be reduced. This allows for a reduction in the number of parts, suppression of the cost, and simplification of the configuration.

As shown in FIG. 8, the controller 30 includes, as functional elements related to the drive of the injector 12, the injection mode switching unit 301, a target injection amount calculation unit 306, an injection time calculation unit 307, an injection criterion determination unit 308, a crank angle determination unit 309, an injection start time point calculation unit 310, and the injector control unit 305.

The target injection amount calculation unit 306 calculates the target amount of injection per combustion cycle on the basis of the amount of intake air detected by the intake air amount sensor 34. The target injection amount calculation unit 306 also calculates the target amount of one injection (the unit target amount of injection) of the injector 12 in accordance with the injection pattern switched by the injection mode switching unit 301. For example, in the case of two-injection intake, a value obtained by dividing the target amount of injection per cycle by two is calculated as the unit target amount of injection.

The injection time calculation unit 307 calculates the target injection time per injection of the injector 12 on the basis of the target amount of one injection (the unit target amount of injection) calculated by the target injection amount calculation unit 306, the fuel pressure detected by the fuel pressure sensor 36, and the fuel temperature detected by the fuel temperature sensor 37. For example, a map representing the relationship among the unit target amount of injection, the fuel pressure, the fuel temperature, and the injection time is previously stored in the memory, and the target injection time is calculated using this map.

Figure 10A:
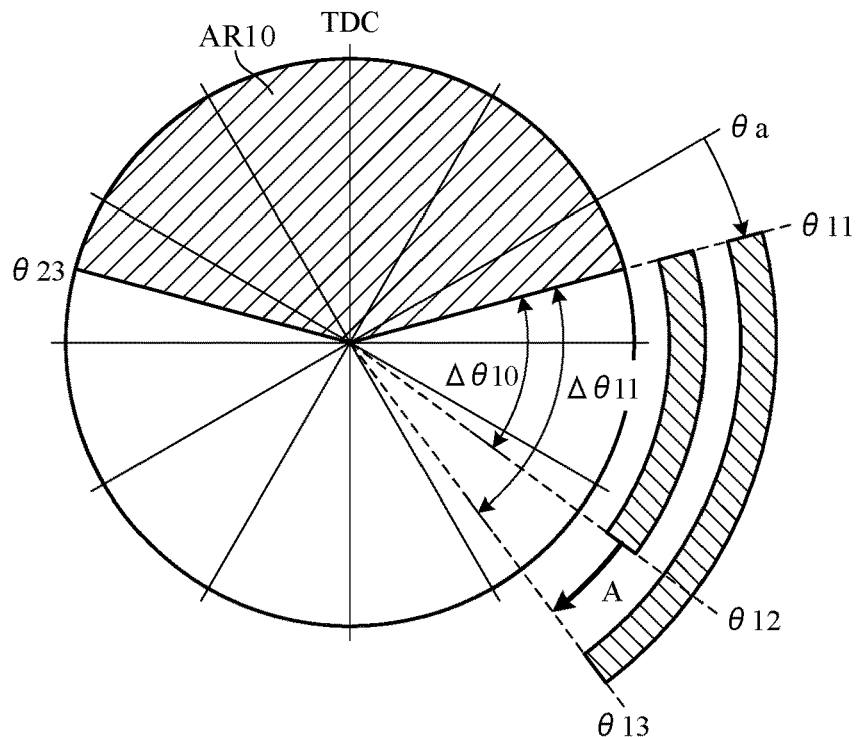
FIG. 10A is a diagram showing an example of an injection patter of fuel in an injection start priority mode by the fuel injection control apparatus according to the embodiment of the invention.

The injection criterion determination unit 308 determines which of the injection start time point and injection end time point should be selected as a reference when the injector 12 injects the fuel, that is, which of the injection start criterion and injection end criterion should be employed when the injector 12 injects the fuel. Hereafter, for convenience, a mode in which the injection start time point is selected as a reference (an injection mode using the start of injection as a reference) is referred to as "an injection start priority mode", and a mode in which the injection end time point is selected as a reference (an injection mode using the end of injection as a reference) as "an injection end priority mode". FIG. 10A is a diagram showing an example of the injection pattern in the injection start priority mode, and FIG. 10B is a diagram showing an example of the injection pattern in the injection end priority mode.

Figure 10B:
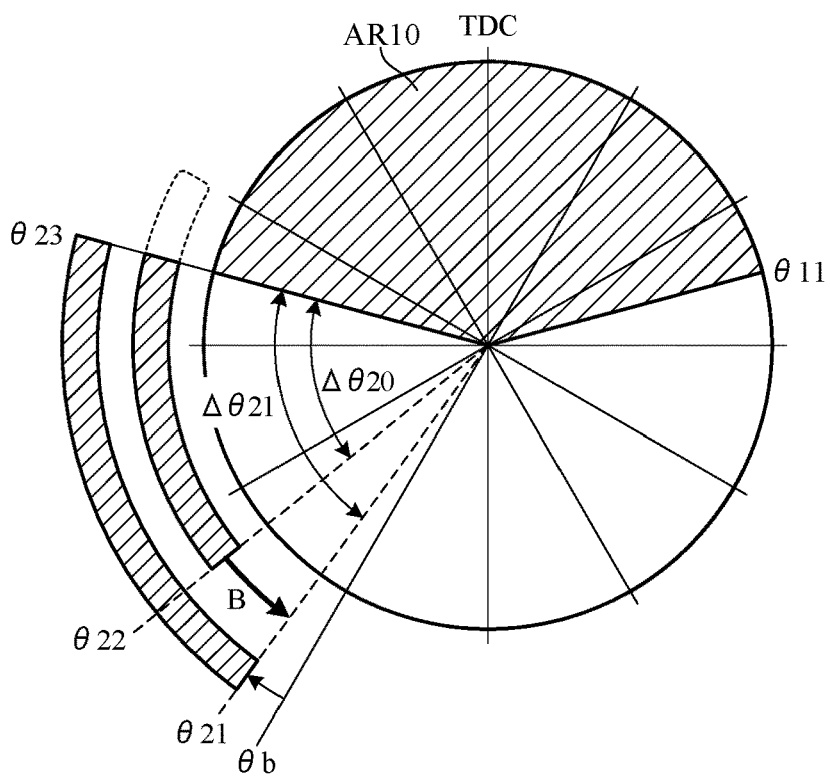
FIG. 10B is a diagram showing an example of an injection patter of fuel in an injection end priority mode by the fuel injection control apparatus according to the embodiment of the invention.

In FIGS. 10A and 10B, a hatched area AR10 centered on the top dead center TDC is an injection-prohibited area in which fuel injection is prohibited in a predetermined injection mode. The injection-prohibited area AR10 varies among the injection modes, and FIGS. 10A and 10B show examples of the injection-prohibited area AR10 in the adherence reduction mode M3. A range from the intake top dead center TDC to a crank angle $\theta 11$ and a range from a crank angle $\theta 23$ to the compression top dead center TDC form a range in which the piston crown surface 103a approaches the injector 12. In these ranges, the fuel injected from the injector 12 may adhere to the piston crown surface 103a and thus soot may be formed on the piston crown surface 103a.

For this reason, the range from the intake top dead center TDC to the predetermined crank angle $\theta 11$ and the range from the predetermined crank angle $\theta 23$ to the compression top dead center TDC are set as the injection-prohibited area AR10 so that adherence of soot is prevented. The crank angles $\theta 11$ and $\theta 23$ defining the injection-prohibited area AR10 vary with the engine speed. For example, as the engine speed is increased, the crank angles $\theta 11$ and $\theta 1$ are reduced. In FIGS. 10A and 10B, the entire range is divided into 30-degree ranges, and the crank angle detected by the crank angle sensor 31 is a multiple of 30°. The injection start time point, injection time, and the like are calculated each time the crank angle is changed by 30°.

As shown in FIG. 10A, in the injection start priority mode, the fuel is injected in a crank angle range $\Delta\theta 11$ ($\theta 11$ to $\theta 13$) corresponding to the target injection time calculated by the injection time calculation unit 307 from the crank angle $\theta 11$ at the injection start time point in the intake stroke. FIG. 10A also shows another crank angle range $\Delta\theta 10$. The crank angle range $\Delta\theta 10$ is a reference crank angle range calculated under a steady state, in which the fuel pressure or the like does not vary. The reference crank angle range $\Delta\theta 10$ is determined by the injection start crank angle θ11 and the injection time previously estimated under a steady state (reference injection time). In this case, the injection end crank angle is θ12.

On the other hand, the target injection time calculated by the injection time calculation unit 307 is determined in accordance with the fuel pressure, fuel temperature, and the like. Accordingly, the target amount of injection may be longer or shorter than the reference injection time. For example, when the fuel pressure is reduced compared to that in a steady state, the target injection time for injecting the fuel in the target amount is increased. As a result, as shown by an arrow A in FIG. 10A, the injection end crank angle is increased compared to the injection end crank angle θ12 in a steady state, that is, becomes θ13 (θ12→θ3). In other words, the injection end crank angle deviates from the injection end crank angle θ12 in a steady state. However, the injection start crank angle is θ11 in FIG. 10A, and even if the injection end time point deviates, the fuel is not injected in the injection-prohibited area AR10.

On the other hand, if the injection end time point deviates when injecting the fuel in the compression stroke, the fuel may be injected in the injection-prohibited area AR10. For this reason, the injection start time point is determined on the basis of the injection end criterion rather than the injection start criterion, as shown in FIG. 10B. Specifically, as shown in FIG. 10B, the fuel is injected using, as the injection start crank angle, a crank angle θ21 obtained by retreating (decreasing) from the injection end crank angle θ23 by a crank angle range Δθ21 corresponding to the target injection time. FIG. 10B also shows another crank angle range 4020. The crank angle range 4020 is a reference crank angle range calculated under a steady state, in which the fuel pressure or the like does not vary. The crank angle range 4020 is determined by the injection end crank angle θ23 and the injection time previously estimated under a steady state (reference injection time). In this case, the injection start crank angle is θ22.

If the fuel injection in the target amount is started from the injection start crank angle θ22, that is, if fuel injection is started on the basis of the injection start criterion, the injection end crank angle may enter the injection-prohibited area AR10, as shown by a dotted line. On the other hand, if fuel injection is started on the basis of the injection end criterion, the injection start crank angle is reduced compared to that in a steady state (θ22→θ21), as shown by an arrow B in FIG. 10B. Thus, the injection start timing is advanced, resulting in prevention of fuel injection in the injection-prohibited area AR10.

The crank angle determination unit 309 determines the crank angles defined in accordance with the injection mode, that is, the injection start crank angle θ11 and injection end crank angle θ23, as well as determines the injection start crank angle in accordance with the injection criterion determined by the injection criterion determination unit 308. Specifically, if the injection criterion determination unit 308 determines that the fuel should be injected on the basis of the injection start criterion (injection start priority mode), the crank angle determination unit 309 determines, as the injection start crank angle, the crank angle θ11 (FIG. 10A) determined in accordance with the injection mode. On the other hand, if the injection criterion determination unit 308 determines that the fuel should be injected in accordance with the injection end criterion (injection end priority mode), the crank angle determination unit 309 determines, as the injection start crank angle, the target crank angle θ21 obtained by retreating from the crank angle θ23 (FIG. 10B) determined in accordance with the injection mode by the crank angle range Δθ21 corresponding to the target injection time. The crank angle range Δθ21 corresponding to the target injection time varies with the engine speed.

The injection start time point calculation unit 310 calculates the time point at which the actual crank angle θ becomes the injection start crank angle θ11 or 021 determined by the crank angle determination unit 309 (FIG. 10A or 10B), that is, the injection start time point. While the crank angle θ is detected by the crank angle sensor 31 every 30°, the injection start crank angle θ11 or 021 may differ from a crank angle θa (=60°) or θb (=210°), which is a multiple of 30°, detected immediately before such a crank angle is detected. For this reason, the time required for the crank angle θ to move from the crank angle θa or θb to the injection start crank angle θ11 or θ21 is calculated using the engine speed at the time point at which the crank angle θ has become θa or θb, and the injection start time point is calculated on the basis of the calculated time.

The injector control unit 305 outputs control signals to the injector 12 (more specifically, injector driver circuit) so that the fuel is injected for the target injection time calculated by the injection time calculation unit 307 from the injection start time point calculated by the injection start time point calculation unit 310. Thus, in the injection start priority mode, the fuel is injected, for example, in a range from the crank angle θ11 to the crank angle θ13 as shown in FIG. 10A; in the injection end priority mode, the fuel is injected, for example, in a range from the crank angle θ21 to the crank angle θ23 as shown in FIG. 10B.

While, as described above, the injection criterion determination unit 308 determines which of the injection start time point and injection end time point should be selected when the injector 12 injects the fuel, that is, determines which of the injection start priority mode and injection end priority mode should be selected, this determination is made in accordance with the injection mode switched by the injection mode switching unit 301. For example, the injection start priority mode is selected in the following first and second cases.

The first case is a case in which the fuel is injected in the intake stroke. Specifically, the first case is a case in which the fuel is injected by one-injection intake or multi-injection intake in the catalyst warm-up mode M2, adherence reduction mode M3, or homogeneity improvement mode M4. If the fuel is injected by multi-injection intake, the first injection is performed in the injection start priority mode. Similarly, if the fuel is injected in the intake stroke and compression stroke (multiple-injection intake-compression), the first injection is performed in the injection start priority mode. By injecting the fuel in the injection start priority mode in the intake stroke as described above, injection in the soot formation area (e.g., the injection-prohibited area AR10 in FIG. 10A) is avoided, resulting in prevention of emission deterioration. Also, formation of a tumble flow in the cylinder 102 is not blocked, allowing the fuel to be injected after tumble flow formation. These result in an improvement in the homogeneity of the mixture and an increase in the combustion efficiency.

The second cases are a case in which the first injection is performed when injecting the fuel by multi-injection compression in the start mode M1 and a case in which the fuel is injected in the compression stroke in the knock suppression mode M5. In particular, by selecting the injection start priority mode in the knock suppression mode M5, the fuel is injected without causing backflow from the intake valve 115 after securely closing the intake valve 115. Thus, the mixture is reliably cooled using the fuel injected from the injector 12, resulting in reliable production of a knocking suppression effect.

On the other hand, the injection end priority mode is selected in the following first and second cases. The first cases include a case in which the fuel is injected by single injection in the start mode M1 and a case in which the last injection is performed when injecting the fuel by multi-injection compression stroke in the start mode M1. The first cases also include a case in which weak stratified combustion is performed in the catalyst warm-up mode M2, more specifically, a case in which the last injection is performed in the compression stroke when injecting the fuel by multi-injection intake-compression or multi-injection compression. By selecting the injection end priority mode in these cases, fuel injection in the expansion stroke is prevented, resulting in prevention of the fuel from flowing back into the injector 12 by the pressure of the mixture during combustion. Also, if the driver circuit 43 or 44 is shared by the opposed cylinders (e.g., first cylinder #1 and fourth cylinder #4) as shown in FIG. 9, one cylinder, #4, is prevented from becoming the fuel injection start timing before another cylinder, #1, ends fuel injection. Also, the fuel injection timing and the ignition timing of the ignition plug 11 are prevented from overlapping each other, resulting in prevention of adherence of the fuel to the ignition plug 11 from blocking the ignition of the ignition plug 11.

The second case is a case in which the last injection is performed in the compression stroke when injecting the fuel by multi-injection intake-compression, multi-injection compression, or the like in the adherence reduction mode M3. By selecting the injection end priority mode in this case, injection in the soot formation area (e.g., the injection-prohibited area AR10 in FIG. 10B) is avoided, resulting in prevention of emission deterioration. Also, if all the injectors 12a to 12d share the booster circuit 42 as shown in FIG. 9 and if the injector 12a of the first cylinder #1 is driven and then the injector 12c of the third cylinder #3 is driven, issuance of a command to drive the injector 12c before the end of drive of the injector 12a is prevented, allowing the fuel to be reliably injected in the target amount from the injectors 12a and 12c.

Figure 11:
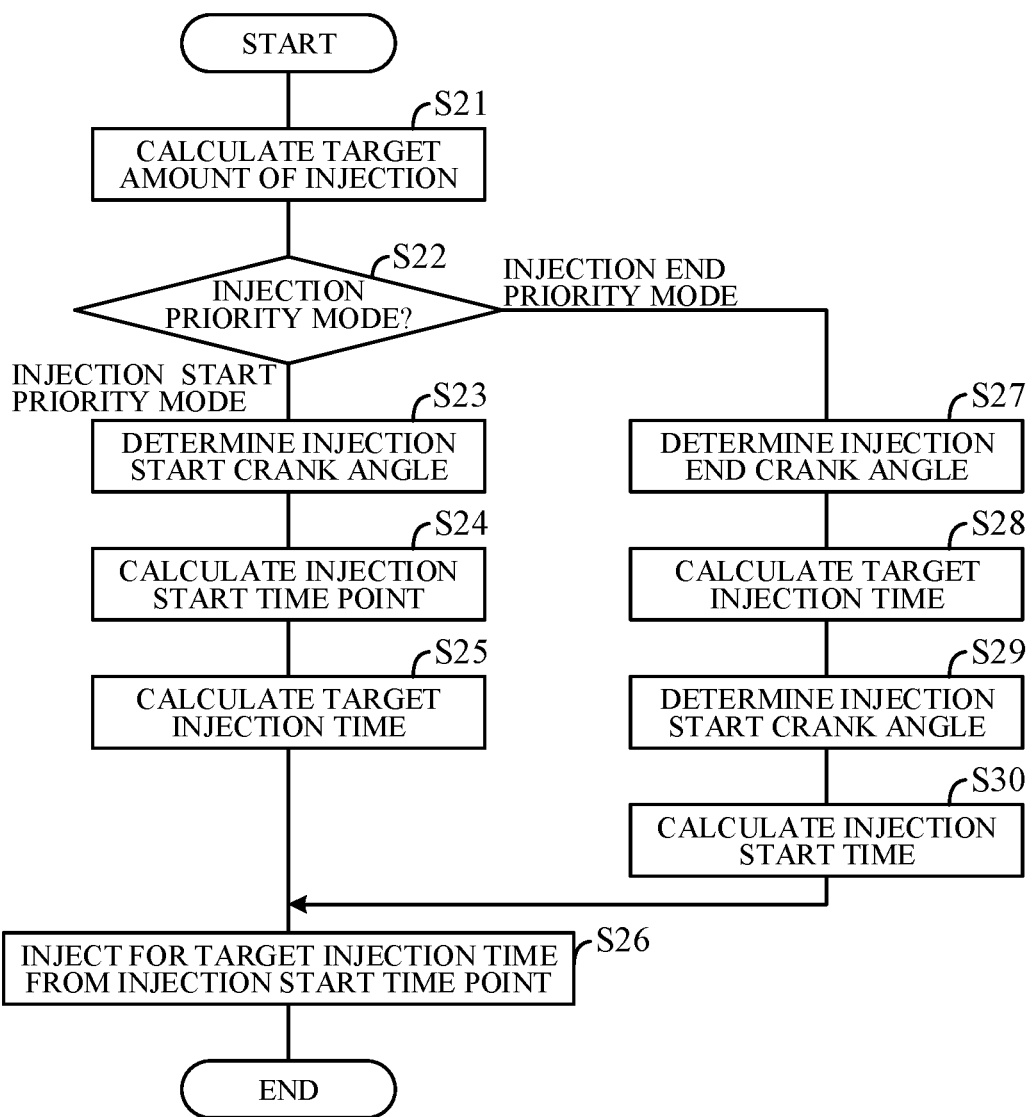
FIG. 11 is a flowchart showing an example of a process performed by a controller in FIG. 8.

FIG. 11 is a flowchart showing an example of a process performed by the controller 30 of FIG. 8 in accordance with a program previously stored in the memory. The process shown in this flowchart is started, for example, when the injection mode is switched to one of the injection modes M1 to M5 other than the fuel stop mode M6 of FIG. 4.

As shown in FIG. 11, first, in S21, the controller 30 calculates the target amount of injection per combustion cycle on the basis of the amount of intake air detected by the intake air amount sensor 34, as well as calculates the target amount of one injection (the unit target amount of injection) of the injector 12 in accordance with the current injection mode, which is one of the injection modes M1 to M5. Then, in S22, the controller 30 determines which of the injection start priority mode and injection end priority mode is the injection priority mode corresponding to the current injection mode, which is one of the injection modes M1 to M5. If it is determined in S22 that the injection start priority mode is the injection priority mode, the process proceeds to S23.

In S23, the controller 30 determines the injection start crank angle (e.g., 011 in FIG. 10A) corresponding to the current injection mode, which is one of M1 to M5. Then, in S24, the controller 30 calculates the injection start time point corresponding to the injection start crank angle determined in S23, on the basis of the engine speed detected by the crank angle sensor 31. Specifically, the controller 30 calculates the time required to move (increase) from the crank angle θa to the injection start crank angle θ11 in FIG. 10A and calculates the injection start time point on the basis of the calculated time.

Then, in S25, the controller 30 calculates the target injection time on the basis of the target amount of one injection (the unit target amount of injection) calculated in S21, the fuel pressure detected by the fuel pressure sensor 36, and the fuel temperature detected by the fuel temperature sensor 37. Then, in S26, the controller 30 outputs control signals to the injector 12 so that the fuel is injected for the target injection time calculated in S25 from the injection start time point calculated in S24. Thus, the fuel is injected, for example, in a range from the crank angle θ11 to the crank angle θ13 in FIG. 10A.

On the other hand, if it is determined in S22 that the injection end priority mode is the injection priority mode, the process proceeds to S27. In S27, the controller 30 determines the injection end crank angle (e.g., 023 in FIG. 10B) corresponding to the current injection mode, which is one of M1 to M5. Then, in S28, the controller 30 calculates the target injection time on the basis of the target amount of one injection (the unit target amount of injection) calculated in S21, the fuel pressure detected by the fuel pressure sensor 36, and the fuel temperature detected by the fuel temperature sensor 37.

Then, in S29, the controller 30 calculates a crank angle range (e.g., Δθ21 in FIG. 10B) corresponding to the target injection time calculated in S28 on the basis of the engine speed detected by the crank angle sensor 31 and determines, as the injection start crank angle, a crank angle (e.g., 021 in FIG. 10B) obtained by retreating (decreasing) from the injection end crank angle determined in S27 by this crank angle range.

Then, in S30, the controller 30 calculates the injection start time point corresponding to the injection start crank angle determined in S29, on the basis of the engine speed detected by the crank angle sensor 31. Specifically, the controller 30 calculates the time required to move (increase) from the crank angle θb to the injection start crank angle θ21 in FIG. 10B and calculates the injection start time point on the basis of the calculated time. Then, the process proceeds to S26, and the controller 30 outputs control signals to the injector 12 so that the fuel is injected for the target injection time calculated in S28 from the injection start time point calculated in S30. Thus, the fuel is injected, for example, in a range from the crank angle θ21 to the crank angle θ23 in FIG. 10B.

The present embodiment can achieve advantages and effects such as the following:

(1) The fuel injection control apparatus according to the present embodiment is formed as a fuel injection control apparatus for the engine 1 including the piston 103 that reciprocates in the cylinder 102 and the injector 12 that injects the fuel into the combustion chamber 105 facing the piston 103 in the cylinder 102 (FIG. 1). This fuel injection control apparatus includes the intake air amount sensor 34 that detects the amount of intake air guided to the cylinder 102; the target injection amount calculation unit 306 calculates the target amount of fuel injected from the injector 12 on the basis of the amount of intake air detected by the intake air amount sensor 34; the injection time calculation unit 307 that calculates the target injection time of the fuel in accordance with the target amount of injection calculated by the target injection amount calculation unit 306; the crank angle determination unit 309 that determines the crank angle defining the start of injection (e.g., θ11 in FIG. 10A) and the crank angle defining the end of injection (e.g., θ23 in FIG. 10B); and the injector control unit 305 that controls the injector 12 so that the fuel is injected in the injection start priority mode, in which the fuel is injected for the target injection time calculated by the injection time calculation unit 307 from the injection start time point corresponding to the injection start crank angle θ11 determined by the crank angle determination unit 309, or the injection end priority mode, in which the fuel is injected for the target injection time from the injection start time point corresponding to the crank angle (target crank angle) θ21 obtained by retreating from the injection end crank angle θ23 determined by the crank angle determination unit 309 by the crank angle range Δθ21 corresponding to the target injection time calculated by the injection time calculation unit 307 (FIG. 8). The injector control unit 305 controls the injector 12 so that the fuel is injected in the injection start priority mode in the intake stroke and the fuel is injected in the injection end priority mode in the compression stroke (FIGS. 10A, 10B). Thus, a delay of the injection end time point is prevented from affecting the combustion performance.

(2) The injector control unit 305 controls the injector 12 so that the first injection is performed in the injection start priority mode when injecting the fuel multiple times in the intake stroke (FIG. 10A). This prevents fuel injection in the intake stroke-side injection-prohibited area AR10 and thus effectively suppresses adherence of soot to the piston crown surface 103a or the like.

(3) The injector control unit 305 controls the injector 12 so that the last injection is performed in the injection end priority mode when injecting the fuel multiple times in the compression stroke (FIG. 10B). This prevents fuel injection in the compression stroke-side injection-prohibited area AR10 and thus effectively suppresses adherence of soot to the piston crown surface 103a or the like.

(4) The fuel injection control apparatus further includes the fuel pressure sensor 36 that detects the pressure of the fuel and the fuel temperature sensor 37 that detects the temperature of the fuel (FIG. 8). The injection time calculation unit 307 calculates the target injection time on the basis of the amount of intake air detected by the intake air amount sensor 34, the fuel pressure detected by the fuel pressure sensor 36, and the fuel temperature detected by the fuel temperature sensor 37. Thus, the injection start time point is determined in the injection end priority mode considering the target injection time corresponding to the variations in the fuel pressure or the like. As a result, the crank angle at which when injection in the target amount is complete is accurately matched with the injection end crank angle θ23.

(5) As another aspect, the injector control unit 305 controls the injector 12 so that the first injection is performed in the injection start priority mode and the last injection is performed in the injection end priority mode when injecting the fuel multiple times (for example, by multi-injection intake-compression) in a range from the start of the intake stroke to the end of the compression stroke. Thus, a delay of the injection end time point is prevented from affecting the combustion performance.

(6) In this case, the injector control unit 305 controls the injector 12 so that the first injection is performed in the intake stroke and the last injection is performed in the compression stroke. This reliably prevents injection in the injection-prohibited area AR10 shown in FIGS. 10A and 10B.

(7) The fuel injection control apparatus further includes the injection mode switching unit 301 that switches the injection mode among the multiple injection modes M1 to M5 having different characteristics representing the injection frequency and injection timing in accordance with the operation state of the engine 1 (FIGS. 4 and 8). In this case, the injector control unit 305 controls the injector 12 so that the fuel is injected in the injection start priority mode or injection end priority mode in accordance with the injection mode switched by the injection mode switching unit 301. Depending on the injection mode, there may be a need to accurately obtain the injection end time point. According to the present embodiment, a delay of the injection end time point is prevented from affecting the combustion performance, allowing for injection at the optimum injection timing corresponding to the injection mode.

(8) The injection modes switched by the injection mode switching unit 301 include the start mode M1, in which the engine 1 is started (FIG. 4). When the injection mode switching unit 301 switches the injection mode to the start mode M1, the injector control unit 305 controls the injector 12 so that the fuel is injected in the injection end priority mode. Thus, the injection end timing in the start mode M1 is accurately defined, allowing for the optimum start of the engine 1 in the start mode M1.

(9) The start mode M1 is an injection mode in which the fuel is injected multiple times, for example, in a range from the start of the intake stroke to the end of the compression stroke. When the injection mode switching unit 301 switches the injection mode to the start mode M1, the injector control unit 305 controls the injector 12 so that the first injection is performed in the injection start priority mode and the last injection is performed in the injection end priority mode. Thus, if the fuel is injected multiple times in the start mode M1, the injection timing is optimally controlled.

(10) The injection modes switched by the injection mode switching unit 301 include the catalyst warm-up mode M2, in which the exhaust catalyst device 13 is warmed up (FIG. 4). When the injection mode switching unit 301 switches the injection mode to the catalyst warm-up mode M2, the injector control unit 305 controls the injector 12 so that the fuel is injected in the injection end priority mode. Thus, the injection end timing in the catalyst warm-up mode M2 is accurately defined, allowing for optimum warm-up of the catalyst device 13 in the catalyst warm-up mode M2.

(11) The injection modes switched by the injection mode switching unit 301 include the adherence reduction mode M3, in which the inside of the cylinder 102 is warmed up (FIG. 4). The adherence reduction mode M3 is an injection mode in which the fuel is injected multiple times in a range from the start of the intake stroke to the end of the compression stroke. When the injection mode switching unit 301 switches the injection mode to the adherence reduction mode M3, the injector control unit 305 controls the injector 12 so that the first injection is performed in the injection start priority mode and the last injection is performed in the injection end priority mode. Thus, fuel injection in the injection-prohibited area AR10 is prevented, resulting in favorable suppression of adherence of soot to the piston crown surface 103a.

(12) The injection modes switched by the injection mode switching unit 301 include the homogeneity improvement mode M4, in which the fuel is injected only in the intake stroke after warm-up of the inside of the cylinder 102 (FIG. 4). When the injection mode switching unit 301 switches the injection mode to the homogeneity improvement mode M4, the injector control unit 305 controls the injector 12 so that the fuel is injected in the injection start priority mode. Thus, the injection start timing in the homogeneity improvement mode M4 is accurately defined, allowing for optimum operation of the engine 1 in the homogeneity improvement mode M4.

(13) The injection modes switched by the injection mode switching unit 301 include the knock suppression mode M5, in which the fuel is injected in the intake stroke and compression stroke such that knocks are suppressed (FIG. 4). When the injection mode switching unit 301 switches the injection mode to the knock suppression mode M5, the injector control unit 305 controls the injector 12 so that the fuel is injected in the injection start priority mode in the compression stroke. Thus, the fuel is injected without causing backflow from the intake valve 115 after securely closing the intake valve 115, allowing for optimum operation of the engine in the knock suppression mode M5.

In the above embodiment, the injector control unit 305 serving as an injector control unit controls the injector 12, for example, so that the fuel is injected in the injection start priority mode (a first injection mode) in the intake stroke and the fuel is injected in the injection end priority mode (a second injection mode) in the compression stroke. In another aspect, the injector control unit 305 controls the fuel injector so that the first injection is performed in the injection start priority mode (a first injection mode) and the last injection is performed in the injection end priority mode (a second injection mode) when injecting the fuel multiple times in a range from the start of the intake stroke to the end of the compression stroke. In yet another aspect, the injector control unit 305 controls the injector 12 so that the fuel is injected in the injection start priority mode (a first injection mode) or injection end priority mode (a second injection mode) in accordance with the injection mode switched by the injection mode switching unit 301. As seen above, an injector control unit controls the injector 12 serving as a fuel injector by switching between the injection start priority mode and injection end priority mode in various modes.

While, in the above embodiment, the crank angle determination unit 309 determines the crank angle $\theta 11$ defining the start of injection (a first crank angle) and the crank angle $\theta 23$ defining the end of injection (a second crank angle) in accordance with the injection mode, the first crank angle and second crank angle may be determined otherwise. In the above embodiment, in the injection start priority mode, the fuel is injected for the target injection time from the injection start time point (a first time point) corresponding to the first crank angle $\theta 11$ determined by the crank angle determination unit 309; in the injection end priority mode, the fuel is injected for the target injection time from the injection start time point (a second time point) corresponding to the crank angle $\theta 21$ (a target crank angle) obtained by decreasing from the second crank angle $\theta 23$ determined by the crank angle determination unit 309 by the crank angle range $\Delta \theta 21$ corresponding to the target injection time. While FIG. 10B shows a case in which the crank angle range $\Delta \theta 21$ is greater than the reference crank angle range 4020 calculated under a steady state, the second time point is calculated also in a case in which $\Delta \theta 21$ is smaller than $\Delta \theta 20$.

While, in the above embodiment, the intake air amount sensor 34 detects the amount of intake air, another type of an air amount detector may be used as long as it detects an amount of air flowing into the cylinder or a physical quantity having a correlation with the amount of the air. While, in the above embodiment, the fuel pressure sensor 36 detects the fuel pressure, a pressure detector may be configured otherwise. While, in the above embodiment, the fuel temperature sensor 37 detects the fuel temperature, a temperature detector may be configured otherwise. While, in the above embodiment, the injector 12 serving as a fuel injector is mounted on the cylinder head 104 obliquely downward, the fuel injector may be configured otherwise as long as it injects the fuel into the combustion chamber in the cylinder.

While, in the above embodiment, the injection mode switching unit 301 switches the injection mode to one of the start mode M1, catalyst warm-up mode M2, adherence reduction mode M3 (cylinder warm-up mode), homogeneity improvement mode M4 (warm-up completion mode), and knock suppression mode M5 and the fuel is injected in the injection start priority mode or injection end priority mode in accordance with the switched injection mode, the fuel may be injected in another injection mode. That is, the above-mentioned injection modes M1 to M5 are only illustrative, and an injection mode switching unit may switch the injection mode to another injection mode.

The invention can be also configured as a fuel injection control method for an internal combustion engine, the internal combustion engine including a piston reciprocating in a cylinder and a fuel injector arranged to inject a fuel into a combustion chamber facing the piston in the cylinder. Specially, the method includes: detecting an amount of an air flowing into the cylinder or a physical quantity having a correlation with the amount of the air; calculating a target injection time of the fuel including a first target injection time and a second target injection time, based on the amount of the air or the physical quantity; determining a first crank angle at which a fuel injection by the fuel injector is to be started and a second crank angle at which the fuel injection is to be ended; controlling the fuel injector so as to inject the fuel in an injection start priority mode in which the fuel is injected for the first target injection time from a first time point corresponding to the first crank angle or an injection end priority mode in which the fuel is injected for the second target injection time from a second time point corresponding to a target crank angle, the target crank angle being obtained by decreasing a crank angle range corresponding to the second target injection time from the second crank angle; and switching an injection mode to one of a plurality of injection modes in accordance with an operating state of the internal combustion engine, an injection frequency and an injection timing being determined in accordance with each of the plurality of injection modes, and wherein the controlling includes controlling the fuel injector so as to inject the fuel in the injection frequency and the injection timing in accordance with the injection mode, and further inject the fuel in the injection start priority mode or the injection end priority mode in accordance with the injection mode.

The above embodiment can be combined as desired with one or more of the above modifications. The modifications can also be combined with one another.

According to the present invention, it is possible to be favorably prevented from affecting a combustion performance due to a delay of an injection end time point.

Above, while the present invention has been described with reference to the preferred embodiments thereof, it will be understood, by those skilled in the art, that various changes and modifications may be made thereto without departing from the scope of the appended claims.

What is claimed is:

1. A fuel injection control apparatus for an internal combustion engine, the internal combustion engine including a piston reciprocating in a cylinder and a fuel injector arranged to inject a fuel into a combustion chamber facing the piston in the cylinder, the apparatus comprising:

an air amount detector configured to detect an amount of an air flowing into the cylinder or a physical quantity having a correlation with the amount of the air; and an electronic control unit having a microprocessor and a memory, wherein the microprocessor is configured to perform:
- calculating a target injection time of the fuel including a first target injection time and a second target injection time, based on the amount of the air or the physical quantity detected by the air amount detector;
- determining a first crank angle at which a fuel injection by the fuel injector is to be started and a second crank angle at which the fuel injection is to be ended;
- controlling the fuel injector so as to inject the fuel in an injection start priority mode in which the fuel is injected for the first target injection time from a first time point corresponding to the first crank angle or an injection end priority mode in which the fuel is injected for the second target injection time from a second time point corresponding to a target crank angle, the target crank angle being obtained by decreasing a crank angle range corresponding to the second target injection time from the second crank angle; and
- switching an injection mode to one of a plurality of injection modes in accordance with an operating state of the internal combustion engine, an injection frequency and an injection timing being determined in accordance with each of the plurality of injection modes, wherein the microprocessor is configured to perform the controlling including controlling the fuel injector so as to inject the fuel in the injection frequency and the injection timing in accordance with the injection mode, and further inject the fuel in the injection start priority mode or the injection end priority mode in accordance with the injection mode, and wherein the injection mode includes a cylinder warm-up mode in which an inside of the cylinder is warmed up, the fuel is injected in a range from a start of an intake stroke to an end of a compression stroke of the internal combustion engine a plurality of times in the cylinder warm-up mode, and the microprocessor is configured to perform the controlling including controlling the fuel injector so as to inject the fuel in the injection start priority mode at a first time and inject the fuel in the injection end priority mode at a last time in the range when the injection mode is switched to the cylinder warm-up mode.

2. The apparatus according to claim 1, wherein the injection mode includes a start mode in which the internal combustion engine is started, and the microprocessor is configured to perform the controlling including controlling the fuel injector so as to inject the fuel in the injection end priority mode when the injection mode is switched to the start mode.

3. The apparatus according to claim 2, wherein the fuel is injected in a range from a start of an intake stroke to an end of a compression stroke of the internal combustion engine a plurality of times in the start mode, and the microprocessor is configured to perform the controlling including controlling the fuel injector so as to inject the fuel in the injection start priority mode at a first time and inject the fuel in the injection end priority mode at a last time in the range when the injection mode is switched to the start mode.

4. The apparatus according to claim 1, wherein the injection mode includes a catalyst warm-up mode in which an exhaust catalyst device disposed on an exhaust passage of the internal combustion engine is warmed up, and the microprocessor is configured to perform the controlling including controlling the fuel injector so as to inject the fuel in the injection end priority mode when the injection mode is switched to the catalyst warm-up mode.

5. The apparatus according to claim 1, wherein the injection mode includes a warm-up completion mode in which the fuel is injected in only the intake stroke after a warm-up of the inside of the cylinder is complete, and the microprocessor is configured to perform the controlling including controlling the fuel injector so as to inject the fuel in the injection start priority mode when the injection mode is switched to the warm-up completion mode.

6. The apparatus according to claim 5, wherein the injection mode includes a knock suppression mode in which the fuel is injected in each of the intake stroke and the compression stroke to suppress an occurrence of a knocking, and the microprocessor is configured to perform the controlling including controlling the fuel injector so as to inject the fuel in the injection start priority mode when the fuel is injected in the compression stroke after the injection mode is switched to the knock suppression mode.

7. The apparatus according to claim 1, further comprising:

a pressure detector configured to detect a pressure of the fuel; and a temperature detector configured to detect a temperature of the fuel, wherein the microprocessor is configured to perform the calculating including calculating the target injection time, based on the amount of the air or the physical quantity detected by the air amount detector, the pressure of the fuel detected by the pressure detector, and the temperature of the fuel detected by the temperature detector.

8. A fuel injection control apparatus for an internal combustion engine, the internal combustion engine including a piston reciprocating in a cylinder and a fuel injector arranged to inject a fuel into a combustion chamber facing the piston in the cylinder, the apparatus comprising:

an air amount detector configured to detect an amount of an air flowing into the cylinder or a physical quantity having a correlation with the amount of the air; and an electronic control unit having a microprocessor and a memory, wherein the microprocessor is configured to function as:
- an injection time calculation unit calculating a target injection time of the fuel including a first target injection time and a second target injection time, based on the amount of the air or the physical quantity detected by the air amount detector;
- a crank angle determination unit determining a first crank angle at which a fuel injection by the fuel injector is to be started and a second crank angle at which the fuel injection is to be ended;

an injector control unit controlling the fuel injector so as to inject the fuel in an injection start priority mode in which the fuel is injected for the first target injection time from a first time point corresponding to the first crank angle or an injection end priority mode in which the fuel is injected for the second target injection time from a second time point corresponding to a target crank angle, the target crank angle being obtained by decreasing a crank angle range corresponding to the second target injection time from the second crank angle; and an injection mode switching unit switching an injection mode to one of a plurality of injection modes in accordance with an operating state of the internal combustion engine, an injection frequency and an injection timing being determined in accordance with each of the plurality of injection modes, wherein the injector control unit is configured to control the fuel injector so as to inject the fuel in the injection frequency and the injection timing in accordance with the injection mode switched by the injection mode switching unit, and further inject the fuel in the injection start priority mode or the injection end priority mode in accordance with the injection mode, and wherein the injection mode includes a cylinder warm-up mode in which an inside of the cylinder is warmed up, the fuel is injected in a range from a start of an intake stroke to an end of a compression stroke of the internal combustion engine a plurality of times in the cylinder warm-up mode, and the injection control unit is configured to control the fuel injector so as to inject the fuel in the injection start priority mode at a first time and inject the fuel in the injection end priority mode at a last time in the range when the injection mode is switched to the cylinder warm-up mode by the injection mode switching unit.

9. The apparatus according to claim 8, wherein the injection mode includes a start mode in which the internal combustion engine is started, and the injection control unit is configured to control the fuel injector so as to inject the fuel in the injection end priority mode when the injection mode is switched to the start mode by the injection mode switching unit.

10. The apparatus according to claim 9, wherein the fuel is injected in a range from a start of an intake stroke to an end of a compression stroke of the internal combustion engine a plurality of times in the start mode, and the injection control unit is configured to control the fuel injector so as to inject the fuel in the injection start priority mode at a first time and inject the fuel in the injection end priority mode at a last time in the range when the injection mode is switched to the start mode by the injection mode switching unit.

11. The apparatus according to claim 8, wherein the injection mode includes a catalyst warm-up mode in which an exhaust catalyst device disposed on an exhaust passage of the internal combustion engine is warmed up, and the injection control unit is configured to control the fuel injector so as to inject the fuel in the injection end priority mode when the injection mode is switched to the catalyst warm-up mode by the injection mode switching unit.

12. The apparatus according to claim 8, wherein the injection mode includes a warm-up completion mode in which the fuel is injected in only the intake stroke after a warm-up of the inside of the cylinder is complete, and the injection control unit is configured to control the fuel injector so as to inject the fuel in the injection start priority mode when the injection mode is switched to the warm-up completion mode by the injection mode switching unit.

13. The apparatus according to claim 12, wherein the injection mode includes a knock suppression mode in which the fuel is injected in each of the intake stroke and the compression stroke to suppress an occurrence of a knocking, and the injection control unit is configured to control the fuel injector so as to inject the fuel in the injection start priority mode when the fuel is injected in the compression stroke after the injection mode is switched to the knock suppression mode by the injection mode switching unit.

14. The apparatus according to claim 8, further comprising:

a pressure detector configured to detect a pressure of the fuel; and a temperature detector configured to detect a temperature of the fuel, wherein the injection time calculation unit is configured to calculate the target injection time, based on the amount of the air or the physical quantity detected by the air amount detector, the pressure of the fuel detected by the pressure detector, and the temperature of the fuel detected by the temperature detector.

15. A fuel injection control method for an internal combustion engine, the internal combustion engine including a piston reciprocating in a cylinder and a fuel injector arranged to inject a fuel into a combustion chamber facing the piston in the cylinder, the method comprising:

detecting an amount of an air flowing into the cylinder or a physical quantity having a correlation with the amount of the air;

calculating a target injection time of the fuel including a first target injection time and a second target injection time, based on the amount of the air or the physical quantity;

determining a first crank angle at which a fuel injection by the fuel injector is to be started and a second crank angle at which the fuel injection is to be ended;

controlling the fuel injector so as to inject the fuel in an injection start priority mode in which the fuel is injected for the first target injection time from a first time point corresponding to the first crank angle or an injection end priority mode in which the fuel is injected for the second target injection time from a second time point corresponding to a target crank angle, the target crank angle being obtained by decreasing a crank angle range corresponding to the second target injection time from the second crank angle; and switching an injection mode to one of a plurality of injection modes in accordance with an operating state of the internal combustion engine, an injection frequency and an injection timing being determined in accordance with each of the plurality of injection modes, wherein the controlling includes controlling the fuel injector so as to inject the fuel in the injection frequency and the injection timing in accordance with the injection mode, and further inject the fuel in the injection start priority mode or the injection end priority mode in accordance with the injection mode, and wherein the injection mode includes a cylinder warm-up mode in which an inside of the cylinder is warmed up, the fuel is injected in a range from a start of an intake stroke to an end of a compression stroke of the internal combustion engine a plurality of times in the cylinder warm-up mode, and the controlling includes controlling the fuel injector so as to inject the fuel in the injection start priority mode at a first time and inject the fuel in the injection end priority mode at a last time in the range when the injection mode is switched to the cylinder warm-up mode.

* * * * *